United States Patent
Lee

(10) Patent No.: US 10,728,267 B2
(45) Date of Patent: Jul. 28, 2020

(54) SECURITY SYSTEM USING TRANSACTION INFORMATION COLLECTED FROM WEB APPLICATION SERVER OR WEB SERVER

(71) Applicant: ELEVISOR CO., LTD., Daejeon (KR)

(72) Inventor: Seok Woo Lee, Daejeon (KR)

(73) Assignee: ELEVISOR CO., LTD., Daejeon (KR)

( * ) Notice: Subject to any disclaimer, the term of this patent is extended or adjusted under 35 U.S.C. 154(b) by 208 days.

(21) Appl. No.: 15/766,005

(22) PCT Filed: Nov. 15, 2016

(86) PCT No.: PCT/KR2016/013134
§ 371 (c)(1),
(2) Date: Apr. 5, 2018

(87) PCT Pub. No.: WO2017/171188
PCT Pub. Date: May 10, 2017

(65) Prior Publication Data
US 2018/0302426 A1    Oct. 18, 2018

(30) Foreign Application Priority Data

Apr. 1, 2016 (KR) .................. 10-2016-0040323
Apr. 1, 2016 (KR) .................. 10-2016-0040326

(51) Int. Cl.
*H04L 29/06* (2006.01)
*G06F 16/2458* (2019.01)
(Continued)

(52) U.S. Cl.
CPC ...... *H04L 63/1425* (2013.01); *G06F 16/2462* (2019.01); *G06F 21/55* (2013.01);
(Continued)

(58) Field of Classification Search
CPC ... H04L 63/1425; H04L 63/20; H04L 63/101; G06F 21/55
See application file for complete search history.

(56) References Cited

U.S. PATENT DOCUMENTS

2004/0107282 A1* 6/2004 Chakraborty ........... H04L 29/06
709/229
2008/0034425 A1* 2/2008 Overcash ................ G06F 21/55
726/22

FOREIGN PATENT DOCUMENTS

JP        2015-519776 A     7/2015
KR  10-2005-0036010 A     4/2005
(Continued)

*Primary Examiner* — Wasika Nipa
(74) *Attorney, Agent, or Firm* — Patent Office of Dr. Chung Park

(57) ABSTRACT

The present disclosure provides a security system comprising: a WAS plug-in agent installed on a web application server (WAS) or a WEB plug-in agent installed on a web server (WEB), wherein the WAS plug-in agent or WEB plug-in agent is configured to collect transaction information; and a management server configured to: receive the transaction information from the WAS plug-in agent or WEB plug-in agent; determine whether the transaction information is normal or abnormal; generate detection information based on the determination; and upon determination that the transaction information is abnormal, transmit, to the WAS plug-in agent or the WEB plug-in agent, a blocking instruction to block a transaction corresponding to the abnormal transaction information. According to the present disclosure, the analysis of decrypted transaction information may allow detecting SSL/TLS based encrypted attacks and coping with web hacking attacks at session level after normal login.

12 Claims, 18 Drawing Sheets

Abnormal transaction is not detected and coped with due to encryption

SSL/TLS for security

(51) Int. Cl.
*G06F 21/55* (2013.01)
*H04L 29/08* (2006.01)

(52) U.S. Cl.
CPC .......... *G06F 21/554* (2013.01); *H04L 63/101* (2013.01); *H04L 63/166* (2013.01); *H04L 63/20* (2013.01); *H04L 67/02* (2013.01); *H04L 67/146* (2013.01)

(56) References Cited

FOREIGN PATENT DOCUMENTS

| | | | |
|---|---|---|---|
| KR | 10-2010-0071747 | A | 6/2010 |
| KR | 10-2011-0081103 | A | 7/2011 |
| KR | 10-1282297 | B1 | 7/2013 |

\* cited by examiner

SECURITY SYSTEM USING TRANSACTION INFORMATION COLLECTED FROM WEB APPLICATION SERVER OR WEB SERVER

CROSS-REFERENCE TO PRIOR APPLICATIONS

This application is a national Stage Patent Application of PCT International Patent Application No. PCT/KR2016/013134, filed on Nov. 15, 2016 under 35 U.S.C. § 371, which claims priority of Korean Patent Application Nos. 10-2016-0040323, filed on Apr. 1, 2016, and 10-2016-0040326, filed on Apr. 1, 2016, which are all hereby incorporated by reference in their entirety.

TECHNICAL FIELD

Embodiments of the present disclosure relate to a security system using transaction information collected from a web application server or a web server. More particularly, the present disclosure relates to a security system capable of performing logical security management using transaction information collected from a web application server or a web server.

RELATED ART

Conventional security management systems (IDS, IPS, ESM, FW, WAF, etc.) perform security operations including intrusion detection and blocking by sniffing TCP/IP packets and parsing packets in layers up to L4 or L7 layers. However, since those conventional approaches are packet dependent, they cannot detect an SSL/TLS based encrypted attack and cannot cope with a web hacking attack during the session after a normal login.

As shown in FIG. 1, a conventional intrusion prevention system (IPS) or intrusion detection system (IDS) is a physical security management system configured to analyze contents (header+data) of packets transmitted to the network and to detect and cope with an attack. However, because, based on a protocol that supports SSL/TLS for security, SSL/TLS functions in an encrypted period, (i) detection and analysis of attacks encrypted with SSL/TLS are not available, (ii) packet follow analysis is not available, (iii) attacks after normal authentication are not coped with; and (iv) there is a limitation for identifying abnormal transactions due to encryption.

SUMMARY

In order to solve the above-mentioned problems, the present disclosures proposes a security system using transaction information collected from an web application server or web server in order to detect attacks encrypted with SSL/SL, and to cope with web hacking attacks during a session after normal authentication.

Other objects s of the present disclosure may be derived by one skilled in the art from the following descriptions.

In one aspect of the present disclosure, there is provided a security system comprising: a WAS plug-in agent installed on a web application server (WAS) or a WEB plug-in agent installed on a web server (WEB), wherein the WAS plug-in agent or WEB plug-in agent is configured to collect transaction information; and a management server configured to: receive the transaction information from the WAS plug-in agent or WEB plug-in agent; determine whether the transaction information is normal or abnormal; generate detection information based on the determination; and upon determination that the transaction information is abnormal, transmit, to the WAS plug-in agent or the WEB plug-in agent, a blocking instruction to block a transaction corresponding to the abnormal transaction information.

In one embodiment, the WAS plug-in agent includes an information collection module, wherein the information collection module includes at least one of an HTTP header information collection module, a web session ID collection module, a user ID information collection module, a DB access information collection module, a web application server information collection module, and a URI (uniform resource identifier) information collection module, wherein the HTTP header information collection module is configured to analyze a HTTP header contained in the transaction information and to collect HTTP header information, wherein the HTTP header information includes at least one of an HTTP method, a URI, a query string, an HTTP Protocol Version, a host, a connection, an accept, a user-agent, a referer, an accept-encoding, a cookie, other header information, and attribute information; wherein the web session ID collection module is configured to collect a user session ID and the unique session ID from the transaction information; wherein the user ID information collection module is configured to collect user ID information included in the transaction information and at a processing of a transaction; wherein the DB access information collection module is configured to collect DB access information included in the transaction information, wherein the DB access information includes at least one of a number of SQL execution events, SQL bind variables, and a number of selects, a number of inserts, the number of updates, the number of deletes and connection pool usage, and connection pool un-return information; wherein the web application server information collection module is configured to collect at least one of a host name of the web application server, a web application server container name, an instant name, a service port, an OS, and a web application server resource usage; wherein the URI information collection module is configured to collect URI transaction information included in the transaction information, wherein the URI transaction information includes at least one of domain and access port information, access URI, call time, total response time, response time per section, CPU resource usage, processing result, AP error and Query String information.

In one embodiment, the WAS plug-in agent includes a unique session ID management module, wherein the unique session ID management module is configured: when a user requests a service to the web application server, to determine that a fixed unique session ID is contained in a persistent cookie, upon determination that the fixed unique session ID is not contained in the persistent cookie, to generate a unique session ID for the user, and to transmit the generated session ID to a web client of the user, to add the generated unique session ID to the persistent cookie, and to identify the user using the unique session ID at a subsequent service request.

In one embodiment, the WEB plug-in agent includes an information collection module, wherein the information collection module includes at least one of an HTTP header information collection module, a web session ID collection module, a user ID information collection module, a web server information collection module, and a URI (uniform resource identifier) information collection module, wherein the HTTP header information collection module is configured to analyze a HTTP header contained in the transaction information and to collect HTTP header information, wherein the HTTP header information includes at least one of an HTTP method, a URI, a query string, an HTTP Protocol Version, a host, a connection, an accept, a user-agent, a referer, an accept-encoding, a cookie, other header information, and attribute information; wherein the web session ID collection module is configured to collect a user session ID and the unique session ID from the transaction information; wherein the user ID information collection module is configured to collect user ID information included in the transaction information and at a processing of a transaction; wherein the web server information collection module is configured to collect at least one of a host name of the web server, a web server container name, an instant name, a service port, an OS, and a web server resource usage; wherein the URI information collection module is configured to collect URI transaction information included in the transaction information, wherein the URI transaction information includes at least one of domain and access port information, access URI, call time, total response time, response time per section, CPU resource usage, processing result, AP error and Query String information.

In one embodiment, the WEB plug-in agent includes a unique session ID management module, wherein the unique session ID management module is configured: when a user requests a service to the web server, to determine whether a unique session ID is included in a permanent cookie; upon determination that the unique session ID is not included in the cookie, to generates an unique session ID corresponding to the user and to send the unique session ID to a web client of the user; to add the generated unique session ID to the cookie; and to identify the user via the unique session ID at a subsequent service request.

In one embodiment, the WEB plug-in agent includes an information collection module, wherein the information collection module includes at least one of an HTTP header information collection module, a web session ID collection module, a user ID information collection module, a web server information collection module, and a URI (uniform resource identifier) information collection module, wherein the HTTP header information collection module is configured to analyze a HTTP header contained in the transaction information and to collect HTTP header information, wherein the HTTP header information includes at least one of an HTTP method, a URI, a query string, an HTTP Protocol Version, a host, a connection, an accept, a user-agent, a referer, an accept-encoding, a cookie, other header information, and attribute information; wherein the web session ID collection module is configured to collect a user session ID and the unique session ID from the transaction information; wherein the user ID information collection module is configured to collect user ID information included in the transaction information and at a processing of a transection; wherein the web server information collection module is configured to collect at least one of a host name of the web server, a web server container name, an instant name, a service port, an OS, and a web server resource usage; wherein the URI information collection module is configured to collect URI transaction information included in the transaction information, wherein the URI transaction information includes at least one of domain and access port information, access URI, call time, total response time, response time per section, CPU resource usage, processing result, AP error and Query String information.

In one embodiment, the management server includes a session ID-based detection module, wherein the session ID-based detection module is configured to perform at least one of first to third detection modes, wherein in the first detection mode, an event that transaction information is first requested, and then, the user session ID and unique session ID are generated, and, then, at re-request of the transaction information, the user session ID and the unique session ID are not maintained in the transaction information is detected as DDOS attacks or web crawlers; wherein in the second detection mode, an event that, at re-request of the service, only the user session ID is maintained and the unique session ID is not maintained is detected as an event that a web client uses a hacking program; wherein in the third detection mode, the abnormal transaction information is detected via mapping between the unique session ID and the user ID.

In one embodiment, the session ID-based detection module is configured to detect, via the mapping between the unique session ID and the user ID: access from a single terminal by multiple users; access from multiple terminals by a single user; attack via a proxy from a single terminal; and/or attack via IP modulation from a single terminal.

In one embodiment, the management server includes a HTTP header information-based detection module, wherein the HTTP header information-based detection module is configured to perform at least one of first to fourth detection modes, wherein in the first detection mode, the HTTP header information-based detection module identifies User-agent information including type and version information of the web client, and detects abnormal transaction based on presence or absence of a specific character string in the User-agent information or via blacklist mapping; wherein in the second detection mode, an event that the HTTP header information includes an unacceptable method among HTTP methods is detected as an abnormal transaction event by the HTTP header information-based detection module; wherein in the third detection mode, an event in which a Proxy-connection string is present in the HTTP header or a character string available for identifying a proxy server exists in the User-agent is detected as an abnormal transaction event by the HTTP header information-based detection module; wherein in the fourth detection mode, the HTTP header information-based detection module detects Perl Compatible Regular Expressions (PCRE) from the HTTP header information.

In one embodiment, the management server includes at least one of a session ID-based statistical analysis module, a HTTP header information-based statistical analysis module, and a URI performance information-based statistical analysis module, wherein the session ID-based statistical analysis module is configured to provide transaction analysis continuity based on each unique session ID, to accurately calculate a number of visitors per day and hour, analyze a transaction distribution based on each unique session ID, and to perform statistical analysis based on each unique session ID, wherein the HTTP header information-based statistical analysis module is configured to analyze statistical analysis per call browser based on HTTP header information, wherein the URI performance information-based statistical analysis module is configured to analyze statistical indexes per domain or statistical information per URI using URI performance information.

In one embodiment, the management server includes a blocking control module, wherein the blocking control module includes a blocking policy management module and a blocking policy control module, wherein the blocking policy management module is configured to perform User-Agent blacklist management, to-be-blocked method management, to-be-blocked session ID management, to-be-blocked user ID management, and to-be-blocked user IP management, wherein the blocking policy control module is configured to control blocking policy including permanent blocking control, time-based blocking control, automatic blocking control, and manual blocking control, wherein the blocking control module is configured to transmit the blocking policy to the WAS plug-in agent over a communication module, wherein when an abnormal transaction is detected, the blocking control module is configured to send the blocking instruction to the WAS plug-in agent.

In one embodiment, the WAS plug-in agent or the WEB plug-in agent includes an abnormal transaction management module configured to receive the blocking instruction from the blocking control module and to block a transaction corresponding to the blocking instruction.

In one embodiment, the management server includes a DB access information-based detection module and a statistical data-based detection module, wherein the DB access information-based detection module is configured to detect bulk data inquiry using the DB access information or to detect Perl Compatible Regular Expressions (PCRE) patterns for SQL queries and bind variables using the DB access information, thereby to detect abnormal transactions based on the detection thereof, wherein the statistical data-based detection module is configured to perform user identification based on a single unique session ID and to perform, based on the user identification, user-specific excessive call detection, user-specific URI repeated call detection, URI-based ranking-based rapid rank-up detection, and abnormal URI call flow detection.

In one embodiment, the management server includes a statistical data-based detection module, wherein the statistical data-based detection module is configured to perform user identification based on a single unique session ID, and to perform, based on the user identification, user-specific excessive call detection, user-specific URI repeated call detection, URI-based ranking-based rapid rank-up detection, and abnormal URI call flow detection.

According to the present disclosure, the analysis of decrypted transaction information may allow detecting SSL/TLS based encrypted attacks and coping with web hacking attacks at session level after normal login.

Further, according to the present disclosure, it is possible to collect decrypted information from the memory of the web application server or web server. This allows various forms of statistical analysis.

DETAILED DESCRIPTIONS

In one aspect of the present discourse, there is provided a security system comprising: a WAS plug-in agent installed on a web application server (WAS) or a WEB plug-in agent installed on a web server (WEB), wherein the WAS plug-in agent or WEB plug-in agent is configured to collect transaction information; and a management server configured to: receive the transaction information from the WAS plug-in agent or WEB plug-in agent; determine whether the transaction information is normal or abnormal; generate detection information based on the determination; upon determination that the transaction information is abnormal, transmit, to the WAS plug-in agent or the WEB plug-in agent, a blocking instruction to block a transaction corresponding to the abnormal transaction information.

The specific details of the embodiments are contained in the detailed description and drawings.

The advantages and features of the present disclosure and the manners in which they are accomplished will be apparent with reference to the embodiments detailed below in conjunction with the accompanying drawings. However, the present disclosure is not limited to the embodiments disclosed below, but may be embodied in many different forms. It will be understood that when an element or layer is referred to as being "connected to", or "coupled to" another element or layer, it can be directly on, connected to, or coupled to the other element or layer, or one or more intervening elements or layers may be present. In other instances, well-known methods, procedures, components, and circuits have not been described in detail so as not to unnecessarily obscure aspects of the present disclosure. The same reference numbers in different figures denote the same or similar elements, and as such perform similar functionality.

Hereinafter, the present disclosure will be described with reference to the accompanying drawings.

Figure 1:
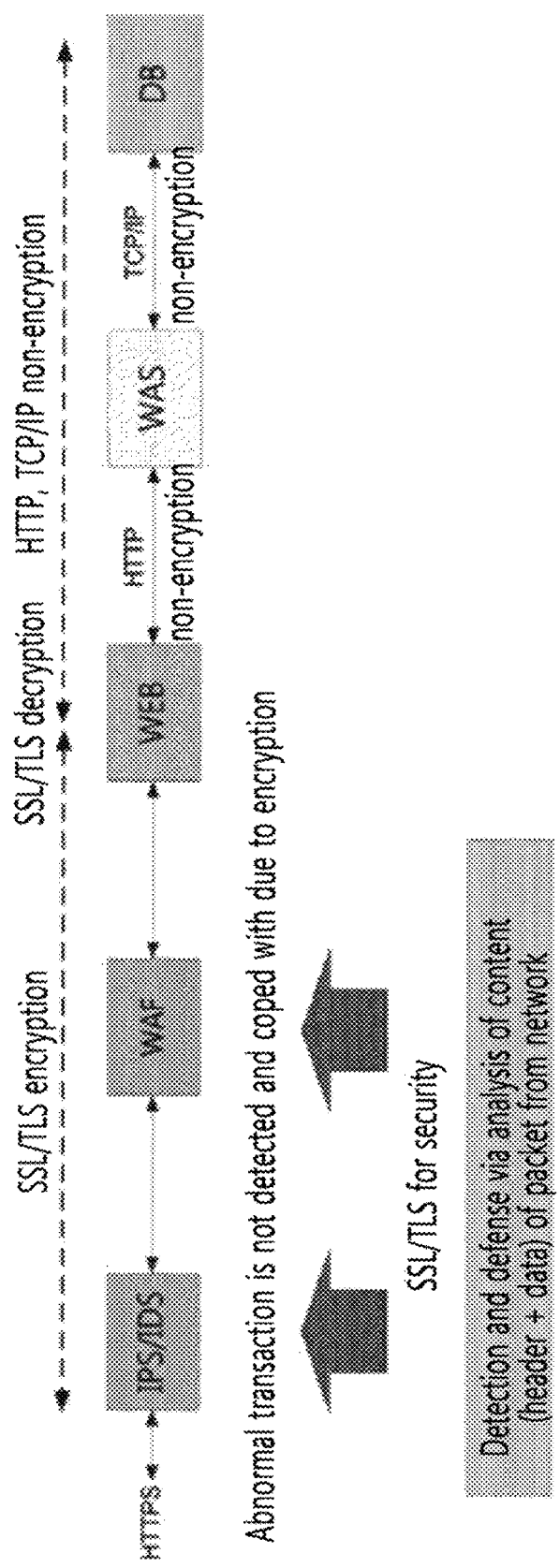
FIG. 1 shows one example of a conventional security management system.
Figure 2:
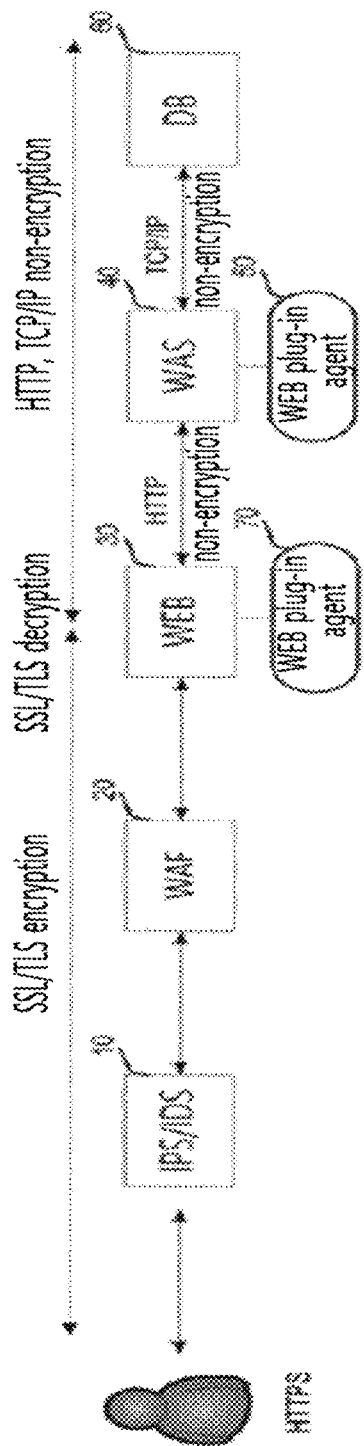
FIG. 2 shows one example of a security management system according to one embodiment of the present disclosure.

FIG. 2 shows one example of a security management system according to one embodiment of the present disclosure.

Conventional security management systems IDS/IPS 10, or web application firewall (WAF) 20, etc. perform security operations including intrusion detection and blocking by sniffing TCP/IP packets and parsing packets in layers up to L4 or L7 layers. However, since those conventional approaches are packet dependent, they cannot detect an SSL/TLS based encrypted attack and cannot cope with a web hacking attack during the session after a normal login. Further, those approaches may not perform packet follow analysis. Further, there is a limitation for identifying abnormal transactions due to encryption.

Therefore, according to the present disclosure, the transaction information of the user requested using the SSL/TLS decrypted in the web server 30 or the web application server 40 is collected by the WAS plug-in agent 50 installed in the web application server 40 or is collected by the WEB plug-in agent 51 installed on the web server 30. The management server performs intrusion detection and blocking and statistical analysis for the transaction using the collected transaction information. This allows the limitations of the IPS/IDS 10 resulting from the encrypted transaction data as described above to be removed.

According to the present disclosure, encrypted SSL/TLS transaction information may be analyzed, and packet follow analysis may be possible. Further, it is possible to cope with attack after normal authentication on the web server 30 or web application server 40. Identification of abnormal transactions becomes possible. Further, it is possible to detect the attack at the session level by using various types of decrypted transaction information collected from the WAS plug-in agent 50 or the WEB plug-in agent 70. Transaction statistic-based detection may be possible.

Figure 3:
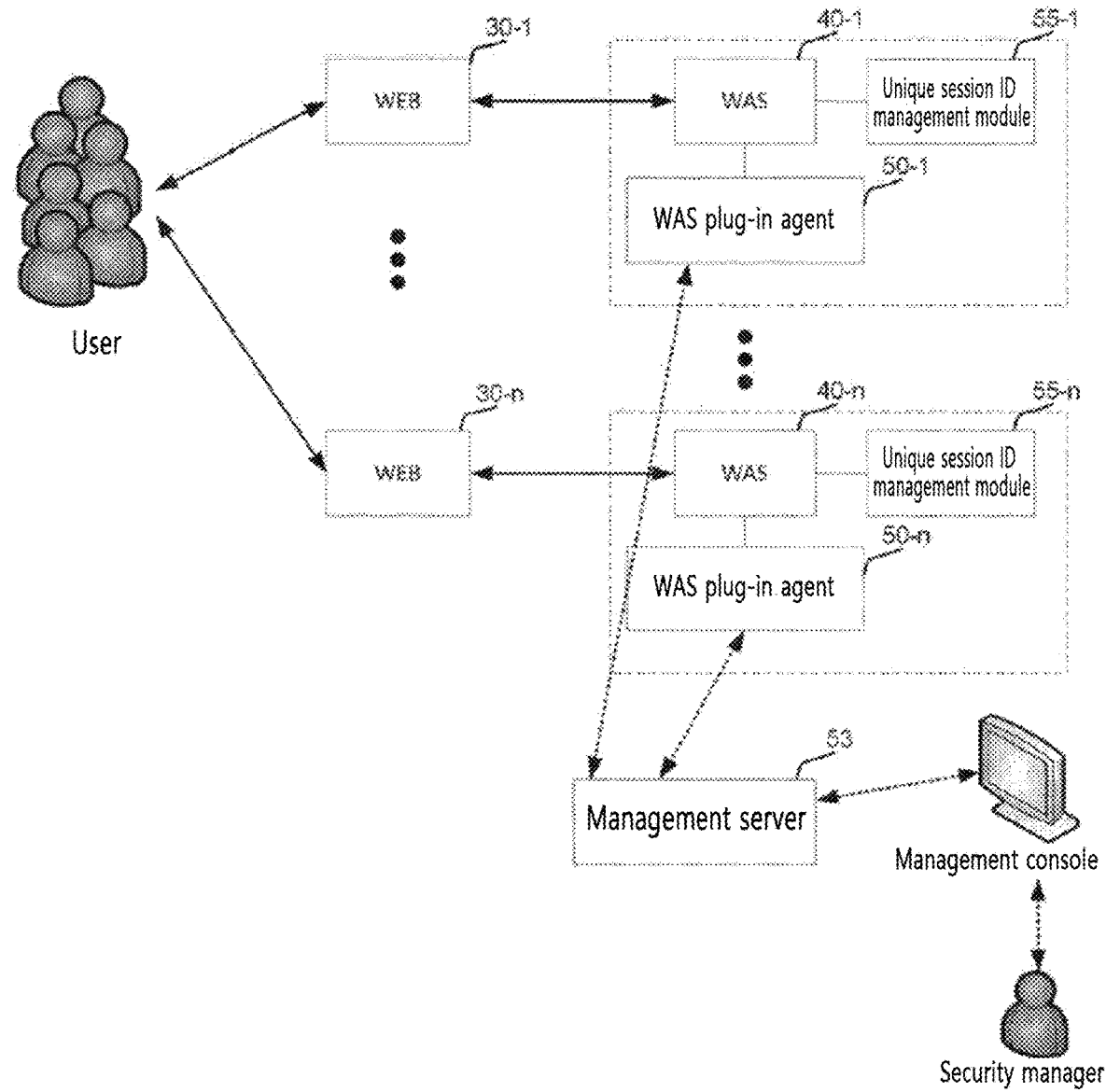
FIGS. 3 and 4 illustrate one example of a security management system including a security system according to one embodiment of the present disclosure.
Figure 4:
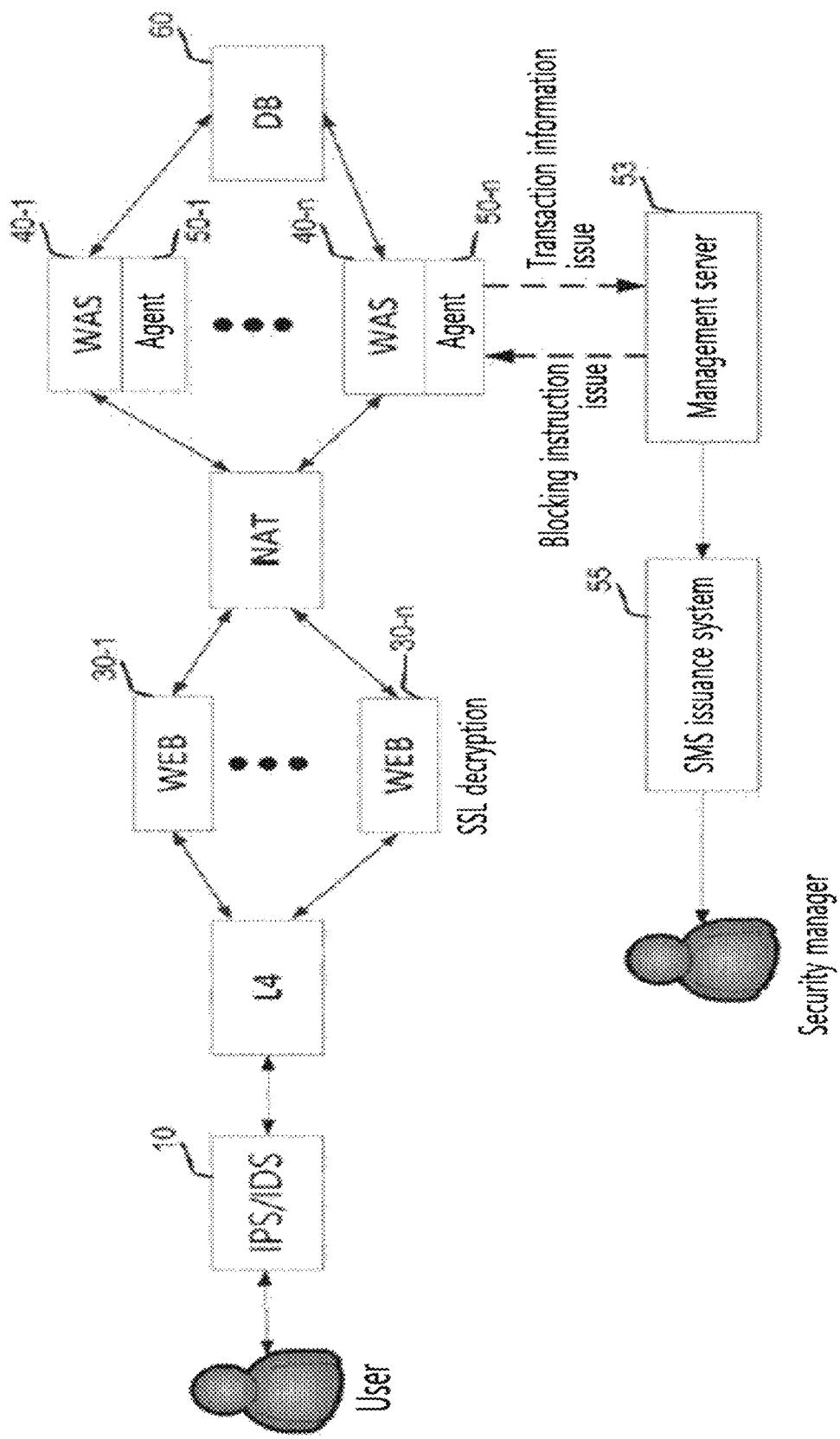

FIGS. 3 and 4 show one example of a security management system including a security system according to one embodiment of the invention.

Referring to FIG. 3 and FIG. 4, a security system according to one embodiment of the present disclosure may include a WAS plug-in agent 50-1 to 50-*n* (hereinafter, 50) and a management server 53.

The WAS plug-in agent 50 is installed and operated in a web application server 40-1 to 40-*n* (hereinafter, 40). The WAS plug-in agent 50 may collect, in real time, from the memory of the web application server 40, the transaction information of the user as requested using the SSL/TLS decrypted in the web application server 40. The SSL/TLS based encrypted request sent to the web application server 40 may be decrypted via authentication success using a certificate from the user on the web application server 40.

In this connection, the transaction information collected by the WAS plug-in agent 50 includes at least one of HTTP header information as included in the packet, URI (uniform resource identifier) transaction information, database access information, and web application server information.

Figure 5:
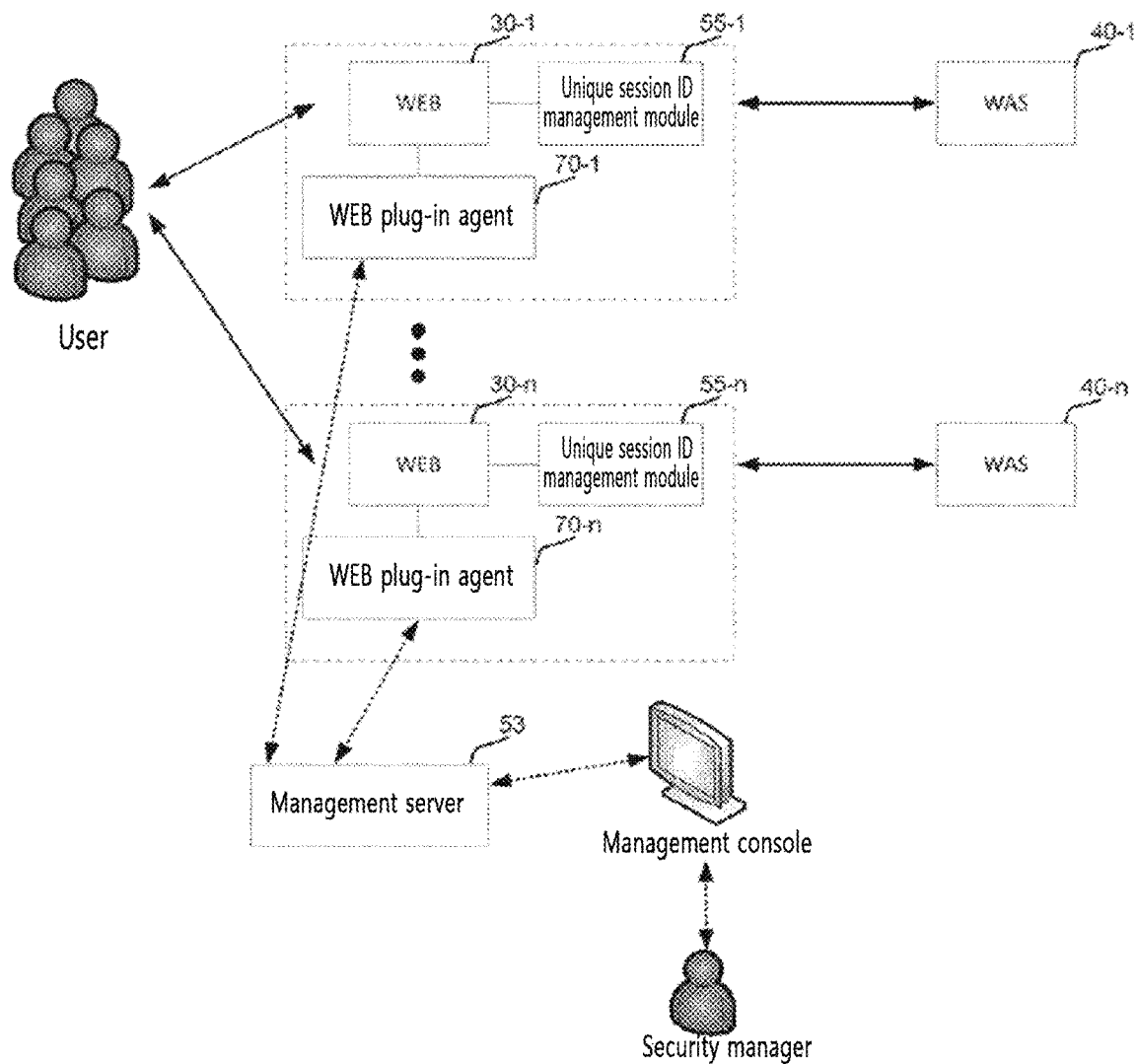
FIGS. 5 and 6 show one example of a security management system including a security system according to one embodiment of the present disclosure.
Figure 6:
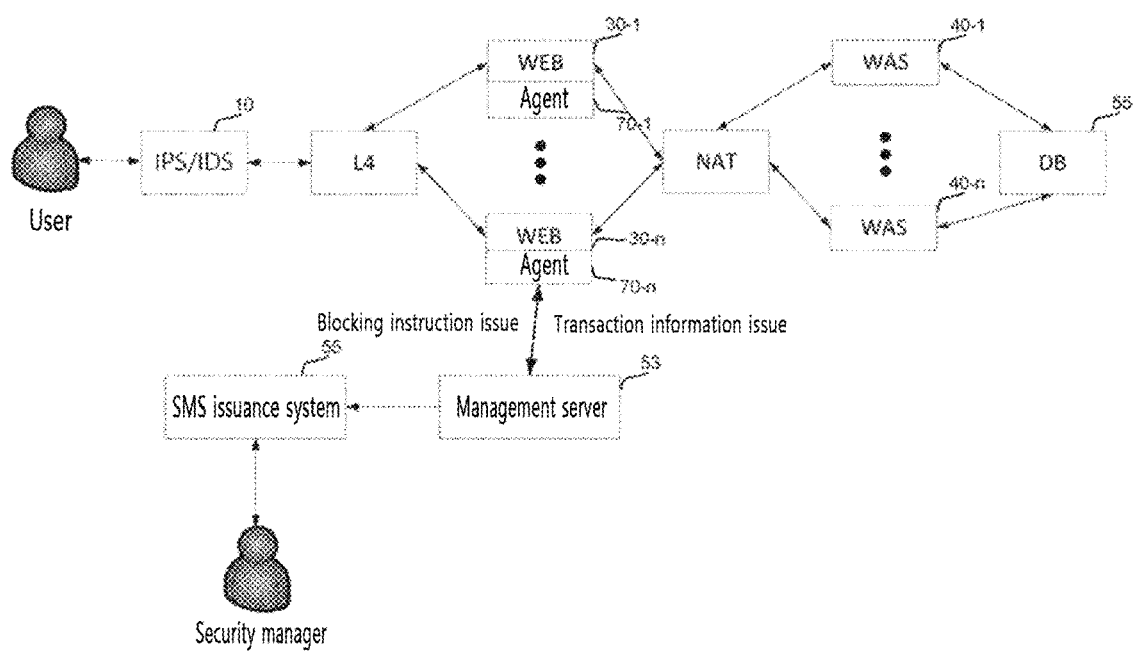

FIGS. 5 and 6 show one example of a security management system including a security system according to another embodiment of the invention.

Referring to FIG. 5 and FIG. 6, the security system according to one embodiment of the present disclosure may include a WEB plug-in agent 70-1 to 70-*n* (hereinafter, 70) and a management server 53.

The WEB plug-in agent 70 is installed and operated in the web server (WEB) 30-1 to 30-*n* (hereinafter, 30). The agent 70 collects, in real time, from the memory of the web server 30, the transaction information of the user as requested using the SSL/TLS decrypted in the web server 30. The SSL/TLS based encrypted request sent to the web server 30 may be decrypted via authentication success using a certificate from the user on the web server 30.

In this connection, the transaction information collected by the WEB plug-in agent 70 includes at least one of HTTP header information as included in the packet, URI (uniform resource identifier) transaction information, and web application server information.

Figure 7:
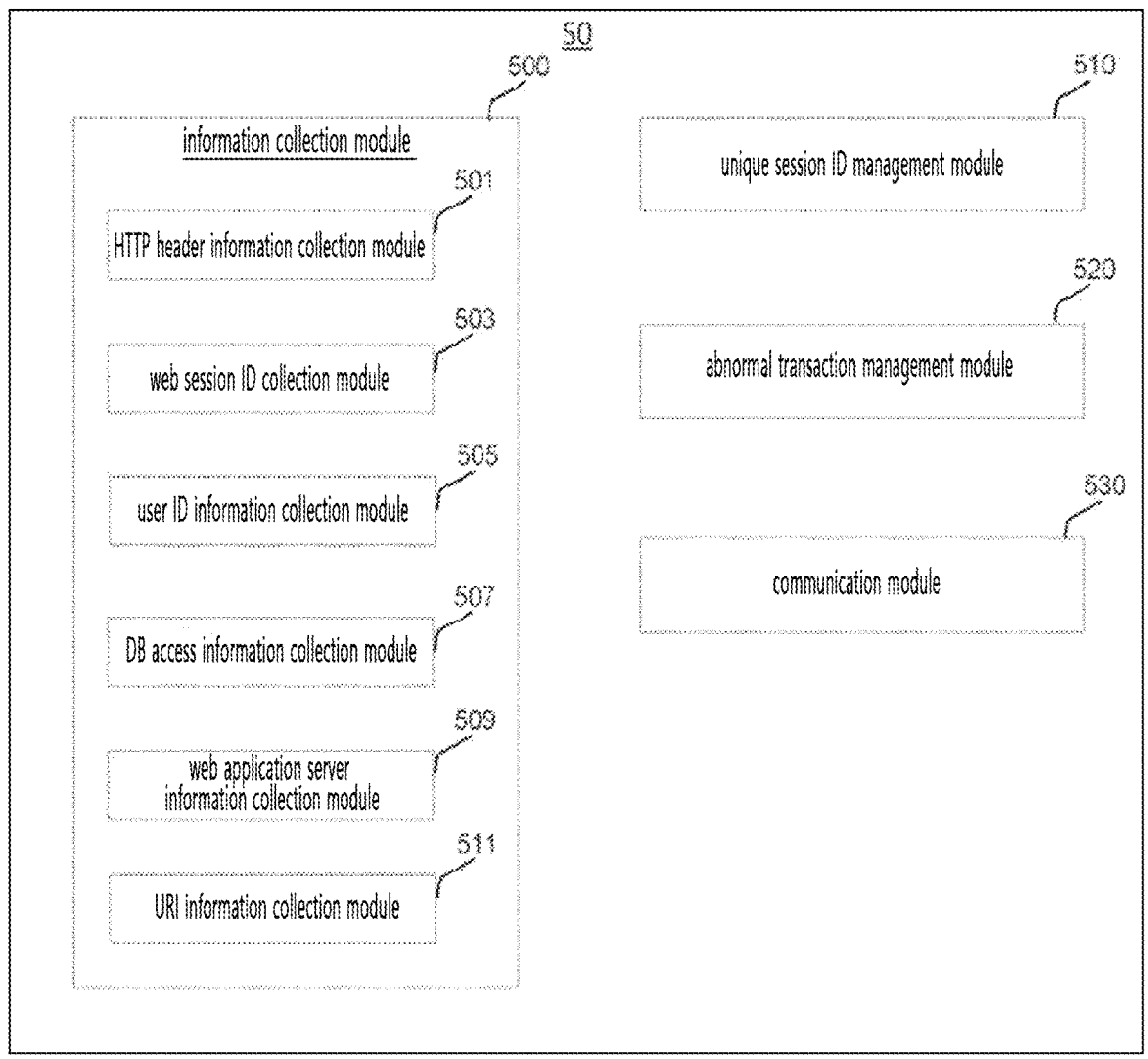
FIG. 7 is a block diagram showing a detailed configuration of a WAS plug-in agent according to one embodiment of the present disclosure.

FIG. 7 is a block diagram showing a detailed configuration of the WAS plug-in agent according to one embodiment of the present disclosure.

Referring to FIG. 7, the WAS plug-in agent 50 may include an information collection module 500, a unique session ID management module 510, an abnormal transaction management module 520, and a communication module 530.

In this connection, the information collection module 500 includes an HTTP header information collection module 501, a web session ID collection module 503, a user ID information collection module 505, a DB access information collection module 507, a web application server information collection module 509, and a URI performance information collection module 511.

The HTTP header information collection module 501 may be configured to analyze the HTTP header and to collect information included in the HTTP header.

In one example, the HTTP header information includes at least one of an HTTP method, a URI, a query string, an HTTP Protocol Version, a host, a connection, an accept, a user-agent, a referer, an accept-encoding, a cookie, other header information, attribute information, etc.

The web session ID collection module 503 may be configured to collect a web session ID of a user and a fixed unique session ID.

The user ID information collection module 505 may be configured to collect user ID information included in transaction information.

The unique session ID management module 510 assigns a fixed unique session ID corresponding to each user and identifies a corresponding user using the unique session ID.

The DB access information collection module 507 may be configured to collect DB access information at a DB access from the WAS plug-in agent, such as DB connection pool usage, a number of SQL execution events, SQL bind variables, and a number of selects, a number of inserts, the number of updates, the number of deletes and connection pool usage via collection of DML (data manipulation language) information, and connection pool un-return information.

The web application server information collection module 509 may be configured to collect information such as a host name of the web application server 40, a web application server container name, an instant name, a service port, an OS, and a web application resource usage, etc.

The URI performance information collection module 511 collects URI transaction information including domain and access port information, access URI. call time, total response time, response time per section, CPU resource usage, processing result, AP error and Query String information.

The abnormal transaction management module 520 performs blocking policy management, preforms abnormal transaction blocking based on a request from the management server 53, and performs blocking status management.

The communication module 530 is configured for supporting bidirectional communication between the WAS plug-in agent 50 and the management server 53. The communication module communicates information collected by the WAS plug-in agent 50 and abnormal transaction management policy between the agent and the management server.

Figure 8:
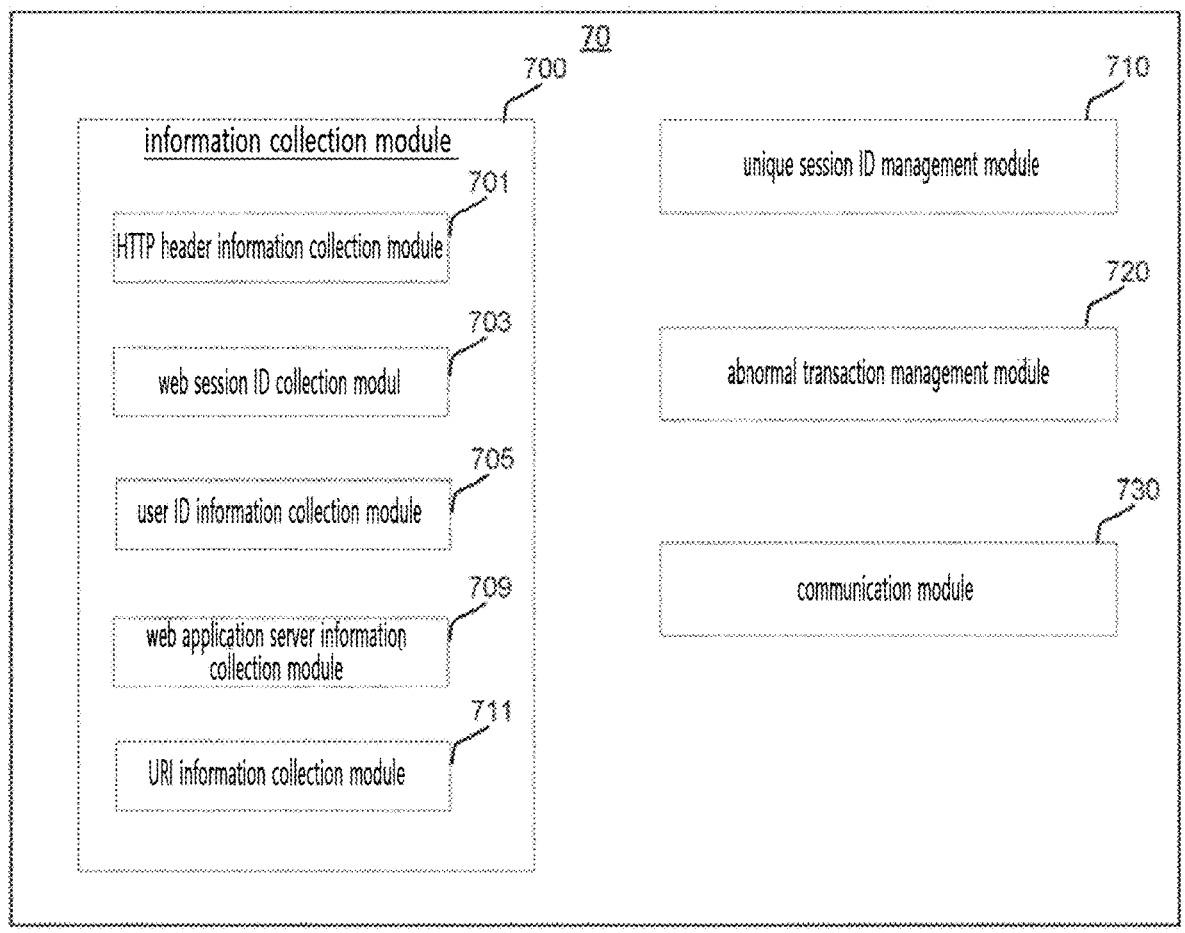
FIG. 8 is a block diagram showing a detailed configuration of a WEB plug-in agent according to one embodiment of the present disclosure.

FIG. 8 is a block diagram showing a detailed configuration of the WEB plug-in agent according to one embodiment of the present disclosure.

Referring to FIG. 8, the WEB plug-in agent 70 may include an information collection module 700, a unique session ID management module 710, an abnormal transaction management module 720, and a communication module 730.

In this connection, the information collection module 700 may include a HTTP header information collection module 701, a web session ID collection module 703, a user ID information collection module 705, a web server information collection module 709, and a URI information collection module 711.

In this connection, the information collection module 700 includes an HTTP header information collection module 701, a web session ID collection module 703, a user ID information collection module 705, a web server information collection module 709, and a URI information collection module 711.

The HTTP header information collection module 701 may be configured to analyze the HTTP header and to collect information included in the HTTP header.

In one example, the HTTP header information includes at least one of an HTTP method, a URI, a query string, an HTTP Protocol Version, a host, a connection, an accept, a user-agent, a referer, an accept-encoding, a cookie, other header information, attribute information, etc.

The web session ID collection module 703 may be configured to collect a web session ID of a user and a fixed unique session ID.

The user ID information collection module 705 may be configured to collect user ID information included in transaction information.

The web application server information collection module 709 may be configured to collect information such as a host name of the web application server 40, a web application server container name, an instant name, a service port, an OS, and a web application resource usage, etc.

The URI performance information collection module 711 collects URI transaction information including domain and access port information, access URI, call time, total response time, response time per section, CPU resource usage, processing result, AP error and Query String information.

The unique session ID management module 710 assigns a fixed unique session ID corresponding to each user and identifies a corresponding user using the unique session ID.

The abnormal transaction management module 720 performs blocking policy management, preforms abnormal transaction blocking based on a request from the management server 50, and performs blocking status management.

The communication module 730 is configured for supporting bidirectional communication between the WEB plug-in agent 50 and the management server 53. The communication module communicates information collected by the WEB plug-in agent 50 and abnormal transaction management policy between the agent and the management server.

In the commonly used HTTP protocol, TCP/IP connection is not maintained. Thus, various methods are used to maintain the session. In the most widely used method, sensitive session information is stored in a server (memory/file/DB, etc.). A key value (session ID) with which the information is found is stored in the browser using a cookie. The web application server 40 or the web server 30 identifies the user (web client) using the session ID sent from the browser. For the URL requested after login, the web application server 40 or the web server 30 identifies the login user via the session ID.

Figure 9:
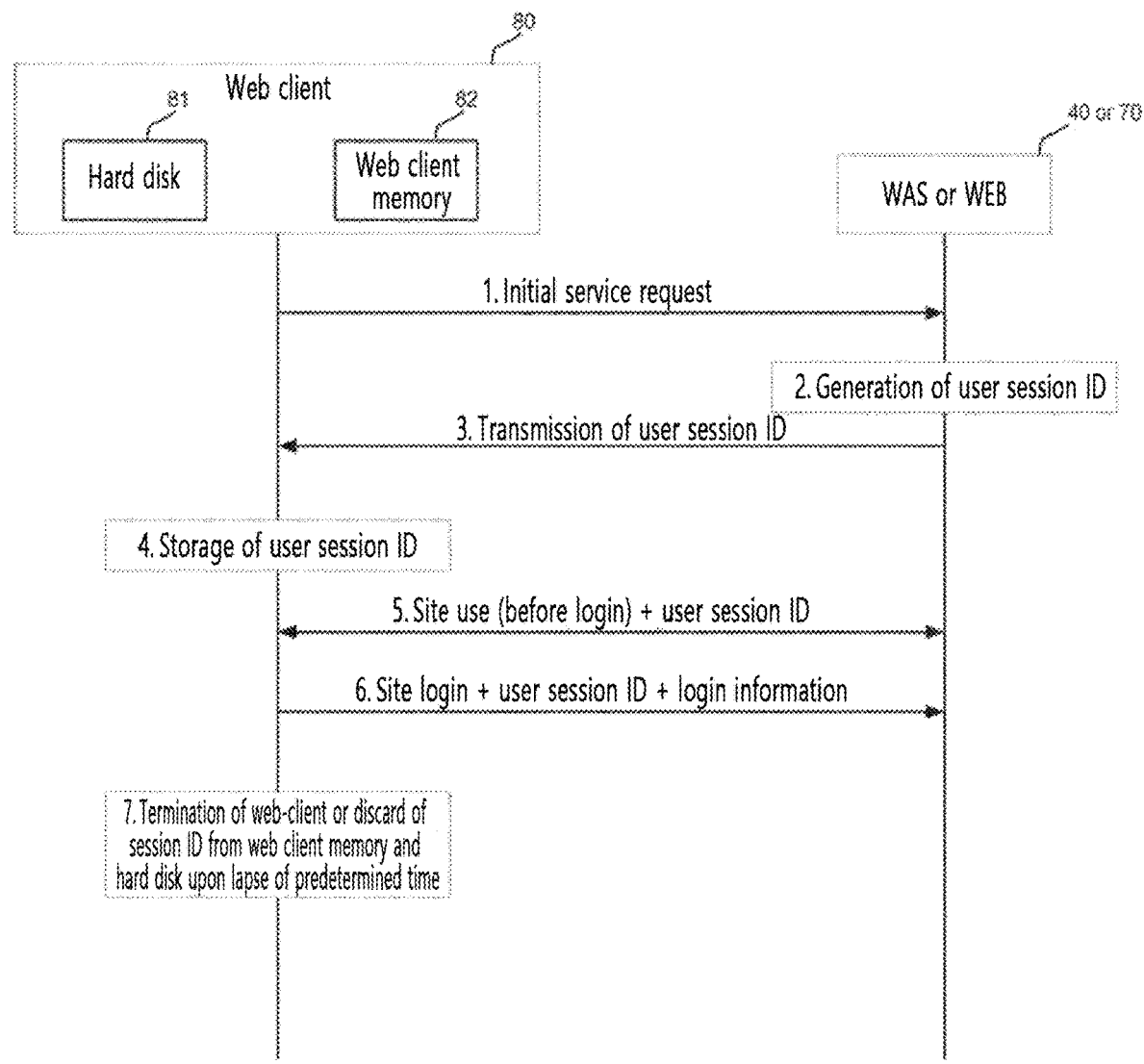
FIG. 9 shows one example of a method for managing a user session ID according to one embodiment of the present disclosure.

Referring to FIG. 9, the user's web client 80 may include a hard disk 81 or a web client memory 82. When the user makes an initial service request to the web application server 40 or the web server 30 through the web client 80, the web application server 40 or the web server 30 generates a user session ID, adds a cookie thereto, applies the same to a response header, and stores the same in a WAS session store. When creating the cookie, the session ID duration in the web client may be set via the setMaxAge setting. The session ID duration may be set as follows.

a. When session ID duration is either not set or set to −1, the corresponding session ID is stored in web client memory;

b. when session ID duration is set to a certain number, the corresponding session ID is maintained for the seconds of the certain number;

c. When session ID duration is set to o, the session ID is immediately discarded.

When the user session ID is transmitted from the web application server 40 or the web server 70 to the web client 80, the web client 80 stores the user session ID therein. When the session ID duration is set as in the above case a, the user session ID is stored in the web client memory 82. When the session ID duration is set as in the above case b, the user session ID is stored in the memory and the hard disk 81 of the web client 80.

The web application server 40 or the web server 70 identifies the user web client using the user session ID before the login. The web application server 40 or the web server 70 identifies the user using the user session ID and login information after login. The user may use the web service via the web application server 40 or the web server 70. When the session ID duration is set as in the case a, and the web client is terminated, the user session ID is discarded. If the user session ID duration is set as in the case b, and after the set time lapses, the user session ID may be discarded from the web client memory 82 and the hard disk 81.

Unlike the conventional user session ID, the unique session ID management module 510 of the WAS plug-in agent 50 or the unique session ID management module 710 of the WEB plug-in agent 70 generates a unique session ID according to the present disclosure. In this connection, the web client is invoked to provide the same session ID to allow user identification.

In the case of the conventional user session ID, when the browser is closed or the PC is rebooted, the session ID is changed upon reconnection to the web application server 40 or the web server 30. Therefore, there was a difficulty in statistical analysis of the same user.

Further, considering the user IP included in the transaction information, when a specific group uses a common IP, transaction information of different users may include the same user IP. In this case, statistical analysis for the users based on IPs has been problematic.

Accordingly, according to the present disclosure, the unique session ID management module 510 or 710 assigns a fixed unique session ID corresponding to each user, and identifies the user using the unique session ID. In this connection, when a user requests a service, it is checked whether the HTTP header (cookie) has an existing unique session ID. If there is no unique session ID, a unique session ID is created and the generated ID is stored in a fixed permanent cookie. Then, the ID and cookie are stored in the hard disk of the web client PC. Thereafter, upon invocation, the corresponding unique session ID as is not changed and is included in the HTTP header may be requested. Therefore, whether or not the users are the same or different users may be identified using the session ID.

Figure 10:
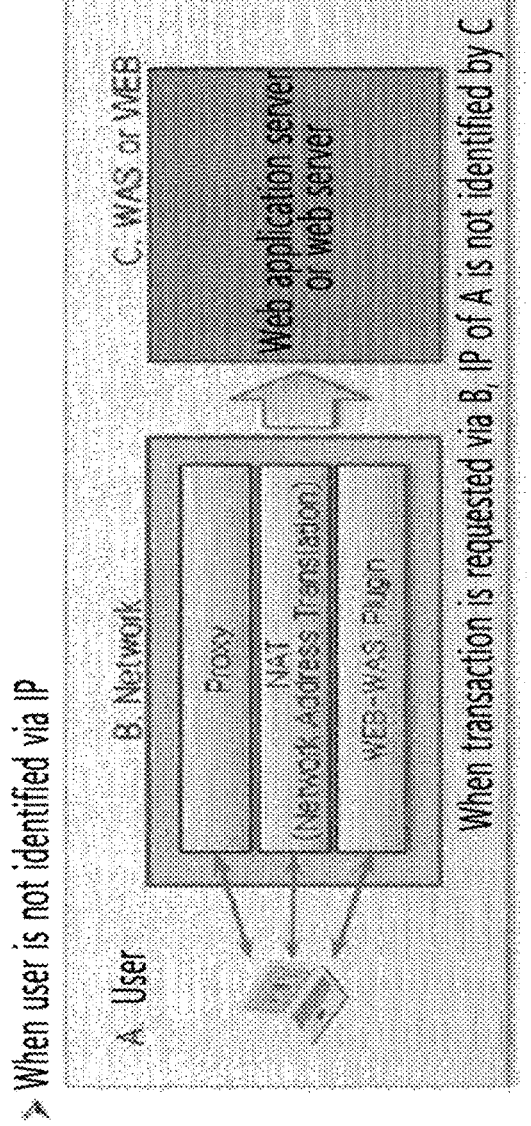
FIG. 10 is an illustration of one example of user identification according to one embodiment of the present disclosure.
Figure 10:
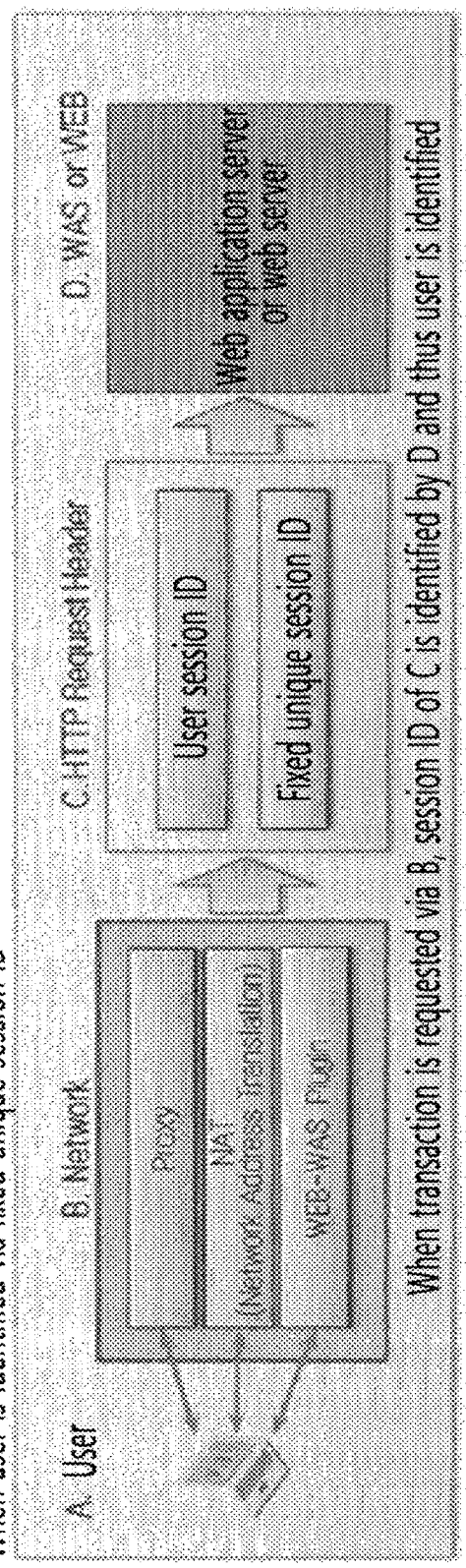

FIG. 10 is an illustration of one example of user identification according to one embodiment of the present disclosure.

In FIG. 10a, when a user's transaction is requested over the network, the web application server 40 or webserver 30 may not be able to perform the IP identification of user A. However, according to the present disclosure, a user is identified using a fixed unique session ID. With referring to FIG. 10b, even when a transaction is requested over the network, the session ID in the HTTP header may be identified by the web application server 40 or the webserver 30.

Figure 11:
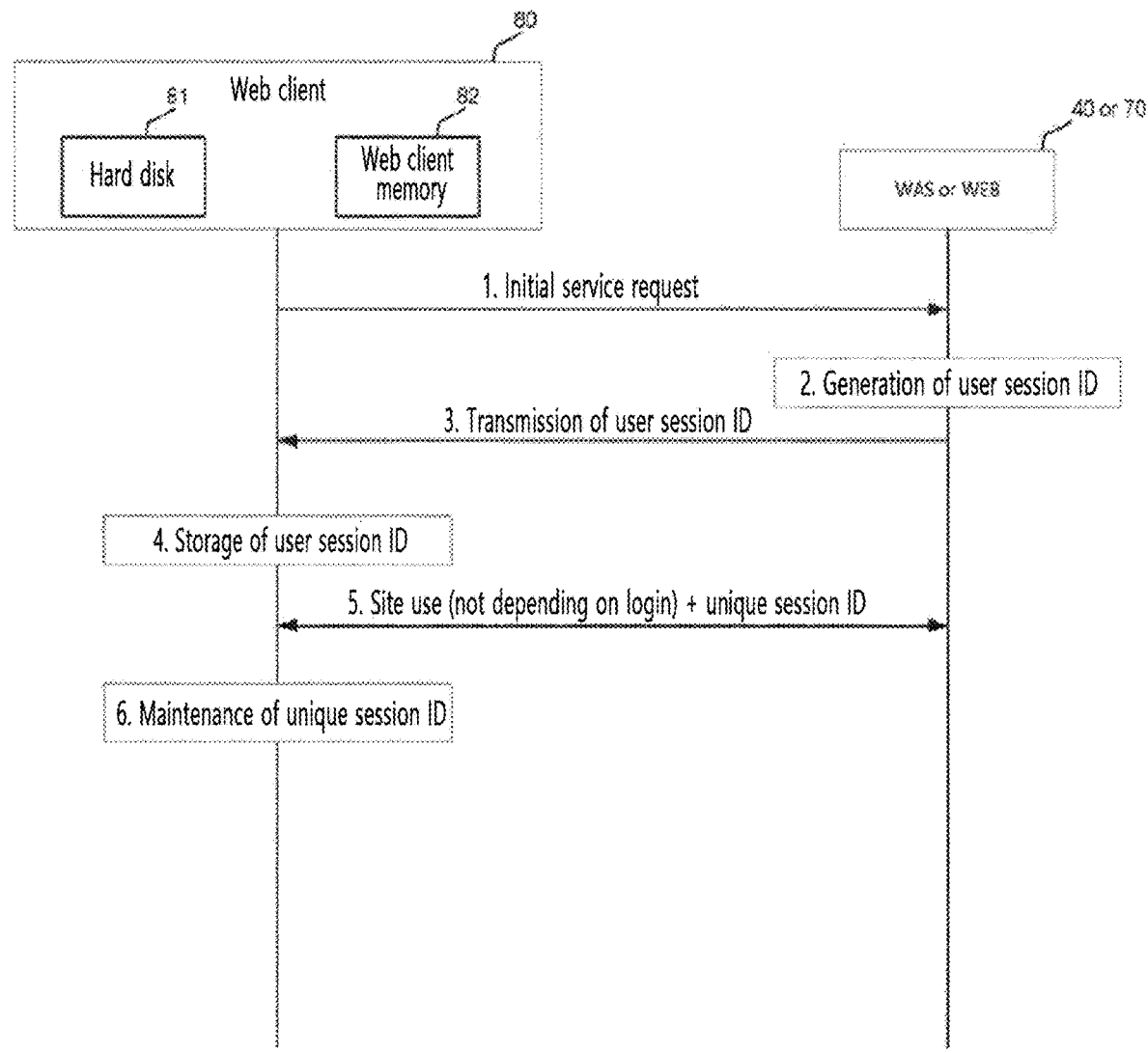
FIG. 11 shows one example of a process of granting a unique session ID according to one embodiment of the present disclosure.
Figure 12:
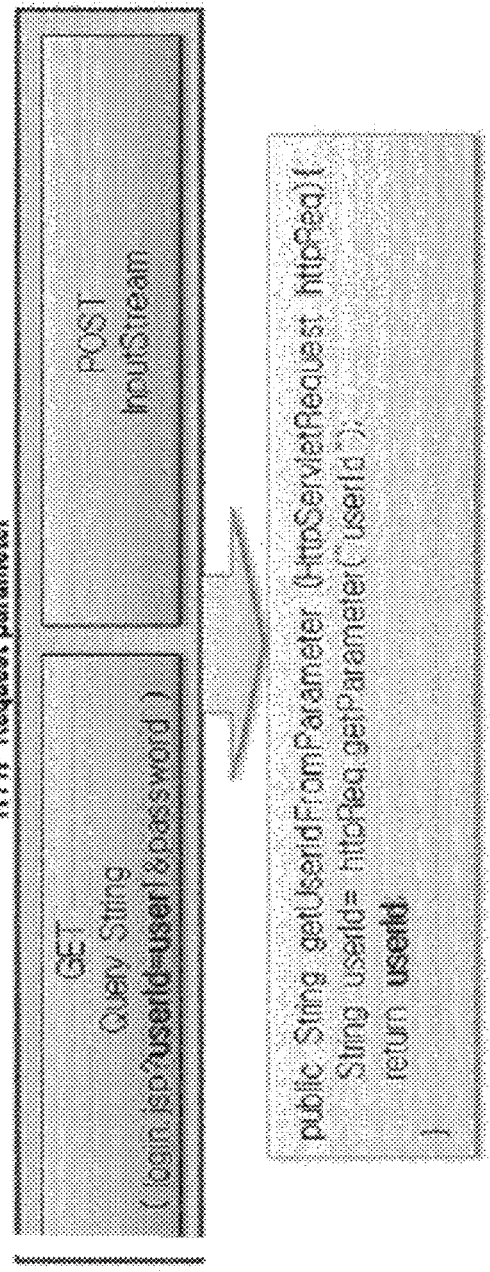
FIG. 12 shows one example of a method for collecting user IDs according to one embodiment of the present disclosure.
Figure 12:
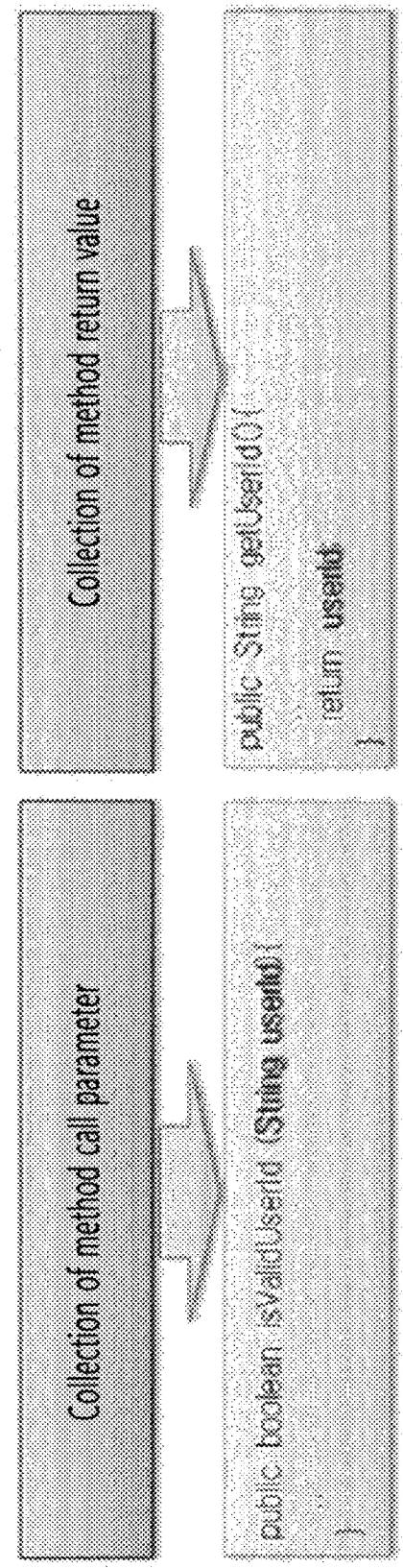

FIG. 11 shows one example of the process of assigning a unique session ID according to one embodiment of the present disclosure.

Referring to FIG. 11, when a web client 80 requests a service transaction, the unique session ID management module 510 or 710 first determines whether a unique session ID is included in the transaction. If the unique session ID is not included in the transaction, the unique session ID management module 510 or 710 generates the unique session ID, adds the same to the cookie, and applies the same to the response header. By setting SetMaxAge to a very large value when creating a cookie, a unique session ID is created on the web client. In one example, setMaxAge is set to 2144448000, whereby the session ID duration may be maintained as 60 years.

Thereafter, the generated unique session ID is transmitted to the web client. The web client stores the unique session ID in a web client memory and a hard disk. When the user uses the site, the unique session ID is maintained regardless of the login. The web application server 40 or the web server 30 may collect a unique session ID from the transaction information as requested by the user and identify the corresponding user by using the ID. Even when the web client 80 is terminated or restarted, the unique session ID is maintained in the hard disk 81. Upon execution of the web client, the unique session ID in the hard disk is recovered from the web client memory 82. Further, upon re-execution of the web client, the unique session ID duration set in the unique session ID may be reconfigured.

FIG. 9 shows one example of a method for collecting user IDs according to one embodiment of the present disclosure.

Referring to FIG. 9, the user ID information collection module 505 or 705 may set the parameter names of the user IDs, and may extract user IDs as follows: in a method#1, only at login time, the user ID may be extracted. Alternatively, the user ID may be extracted using method#2. In the latter method, a method for accessing a user ID is set, a code for information extraction is injected when the corresponding method is loaded into a memory. When executing the corresponding method, the user ID may be extracted from the call parameter and return value.

Referring again to FIG. 4 and FIG. 6, the management server 53 receives transaction information collected from the WAS plug-in agent 50 or the WEB plug-in agent 70. The server 53 determines whether the information is normal transaction information or abnormal transaction information. The server 53 generates detection information based on the determination. The server 53 transmits a blocking instruction for an abnormal transaction according to the security setting to the WAS plug-in agent 50 or the WEB plug-in agent 70.

That is, the management server 53 analyzes various transaction information collected by the WAS plug-in agent 50 or the WEB plug-in agent 70. When the server 53 detects the abnormal transaction information, the server transmits a blocking instruction to the abnormal transaction management module 520 of the WAS plug-in agent 50 or the abnormal transaction management module 720 of the WEB plug-in agent 70. Accordingly, the abnormal transaction management module 520 or 720 may perform automatic blocking for the corresponding unique session ID.

When a security administrator selects a user ID or a unique session ID on the management server 53 and performs manual blocking, the blocking instruction is transmitted to the abnormal transaction management module 520 or 720. As a result, a manual blocking function may be performed in the WAS plug-in agent 50 or the WEB plug-in agent 70.

In case of the unique session ID-based automatic blocking or manual blocking by security administrator, permanent blocking may be set, or blocking period may be set via time based blocking.

That is, according to the present disclosure, when an abnormal transaction occurs, blocking of the corresponding web client may be performed.

Further, when the management server 53 detects abnormal transaction information, the server 53 may transmit a detection SMS of the abnormal transaction to the terminal of the security manager using a SMS sending system 55. The security manager will be able to receive the detection SMS and take immediate action accordingly.

Figure 13:
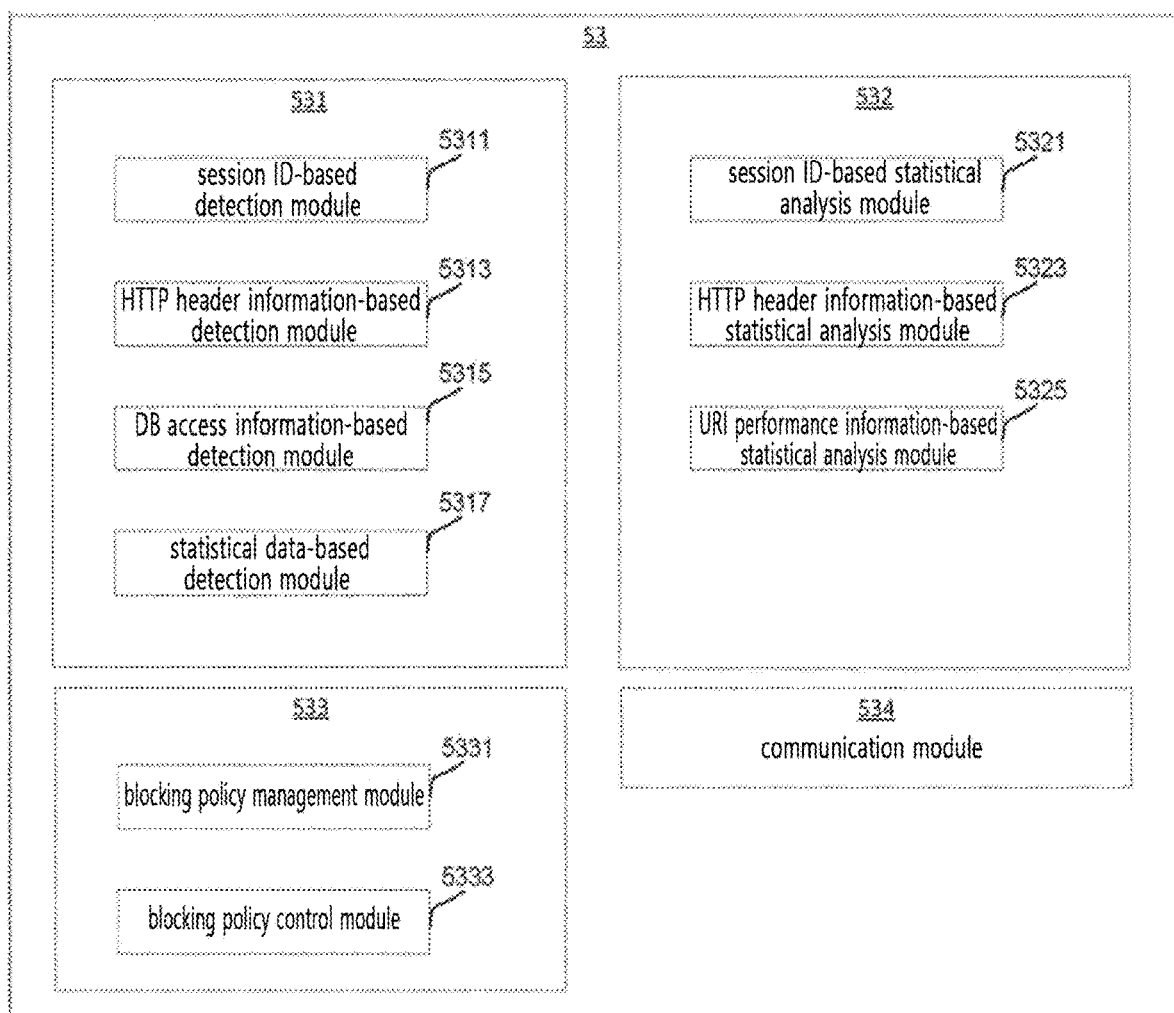
FIG. 13 is a block diagram showing a detailed configuration of a management server according to one embodiment of the present disclosure.

FIG. 13 is a block diagram illustrating a detailed configuration of the management server 53 according to one embodiment of the present disclosure.

Referring to FIG. 13, the management server 53 may include a detection module 531, an analysis module 532, a blocking control module 533, and a communication module 534.

The detection module 531 may include a session ID-based detection module 5311, a HTTP header information-based detection module 5313, a DB access information-based detection module 5315, and a statistical data-based detection module 5317.

The session ID-based detection module 5311 performs user identification using the user session ID and the unique session ID, and determines whether the transaction information is abnormal.

In one example, the transaction information is first requested from the web client, and, then, the user session ID and unique session ID are generated. Then, when the transaction information is requested again and the user session ID and the unique session ID are not retained in the transaction information, these events may be considered DDOS attacks or web crawlers.

Further, when the service is requested again, only the user session ID is maintained and the unique session ID is not maintained. These events may be considered as a web client using hacking programs.

Further, the session ID-based detection module 5311 may detect the abnormal transaction information via mapping between the unique session ID and the user ID.

Figure 14:
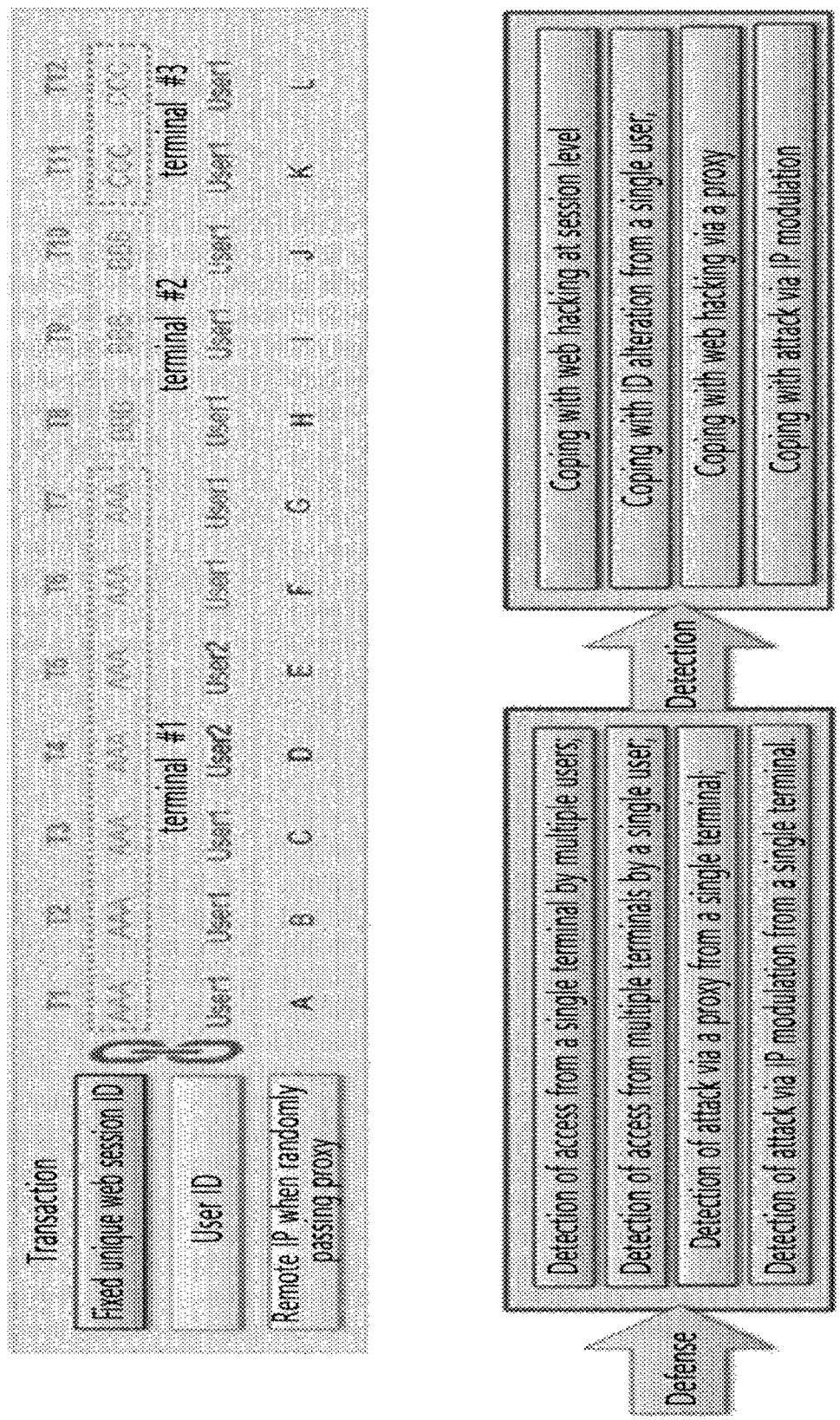
FIG. 14 illustrates detection of mappings between unique sessions IDs and user IDs according to one embodiment of the present disclosure.

FIG. 14 shows the detection of the mapping between the unique session ID and the user ID according to one embodiment of the present disclosure.

The fixed unique session ID remains unchanged in the corresponding terminal even if the user is changed. Thus, the mapping between the unique session ID and the user ID enables abnormal connection detection.

Referring to FIG. 14, User 1 has performed connection from terminal#1 at T1 to T3, T6 to T7, connection from terminal#2 at T8 to T10, connection from terminal#3 at T11 to T12. That is, it may be known that the User 1 has performed the connection from the terminal#1, the terminal#2, and the terminal#3. User 2 has performed the connection only from the terminal#1 at T4 to T5. At T1 to T7, User 1 and User 2 has performed connection from the same terminal#1. That is, two users have performed the connection using the same terminal. When randomly passing the proxy server, the remote IP collected by the web application server is continuously changed because the proxy server IP is collected.

Accordingly, when the remote IP is continuously changed without changing the fixed unique session ID, the session ID-based detection module 5311 may detect that the event is a web hacking via the proxy server. That is, the session ID-based detection module 5311 may detect connection of a plurality of users from the same terminal via the mapping between the unique session ID and the user ID. The module 5311 may detect, via the mapping, that the same user makes a connection from a plurality of terminals. Alternatively, the module 5311 may detect an attack via a proxy from one terminal via the mapping. Further, the module may detect attack by modulating IP from one terminal. When connection of a plurality of users from the same terminal is detected, web hacking defenses can be executed at the session level. When it is detected that the same user performs connection using multiple terminals, An ID modulation attack in the same terminal can be prevented. Further, when an attack via a proxy in a single terminal is detected, web hacking via a proxy may be defeated.

The HTTP header information-based detection module 5313 detects a call transaction that is not a normal web client and thus detects an abnormal transaction. Generally, when an external attack is performed, an abnormal request using a program rather than a call via a general request browser occurs. Accordingly, when a browser other than the requesting browser is detected, the HTTP header information-based detection module 5313 may detect such an event as an abnormal transaction.

Further, the HTTP header information-based detection module 5313 performs a search engine or DDOS attack identification, a transaction identification called via an unacceptable method, and a call parameter pattern analysis identification. This allows an abnormal transaction to be detected.

Figure 15:
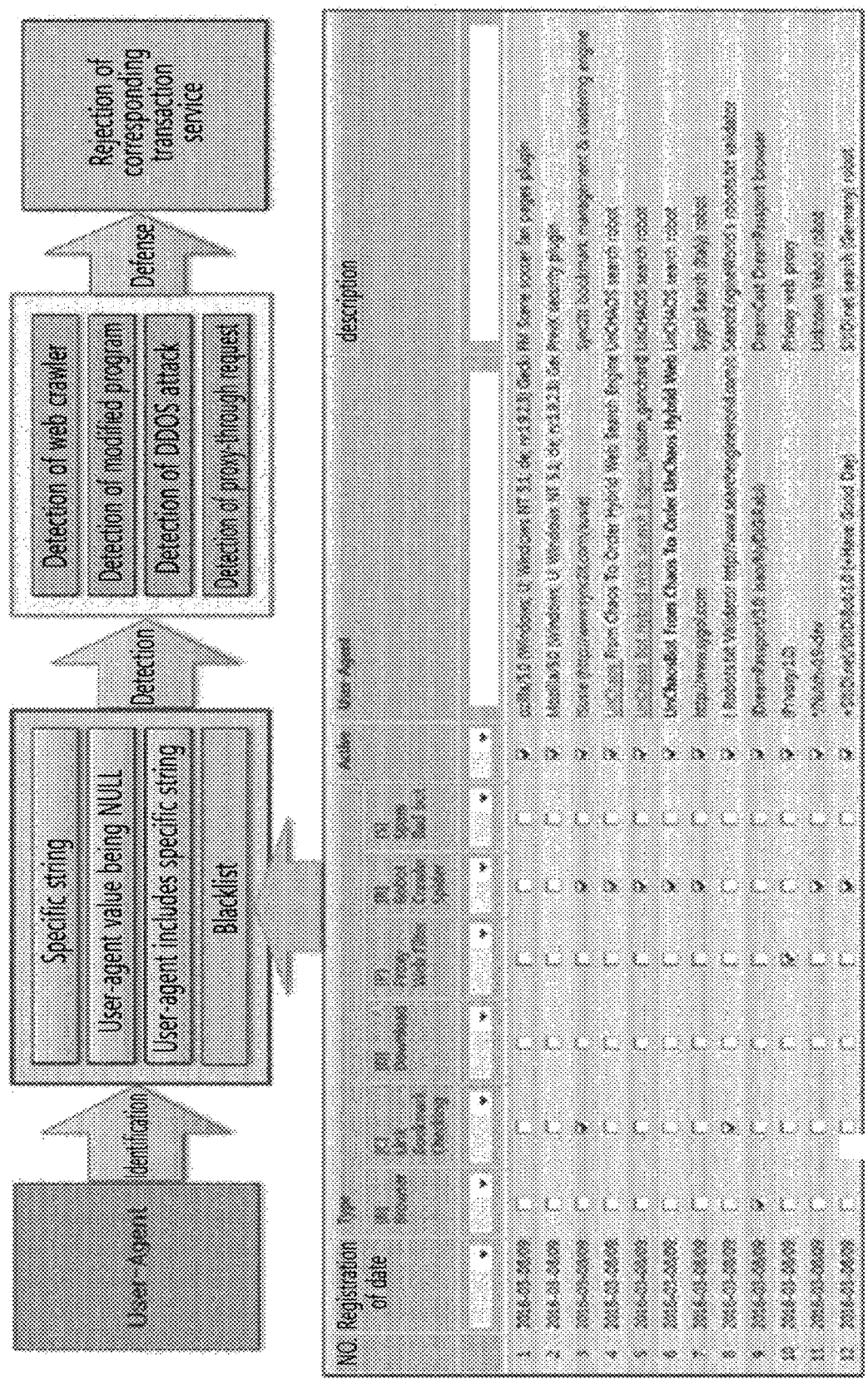
FIGS. 15 through 17 illustrate one example of performing detection based on HTTP header information according to one embodiment of the present disclosure.
Figure 16:
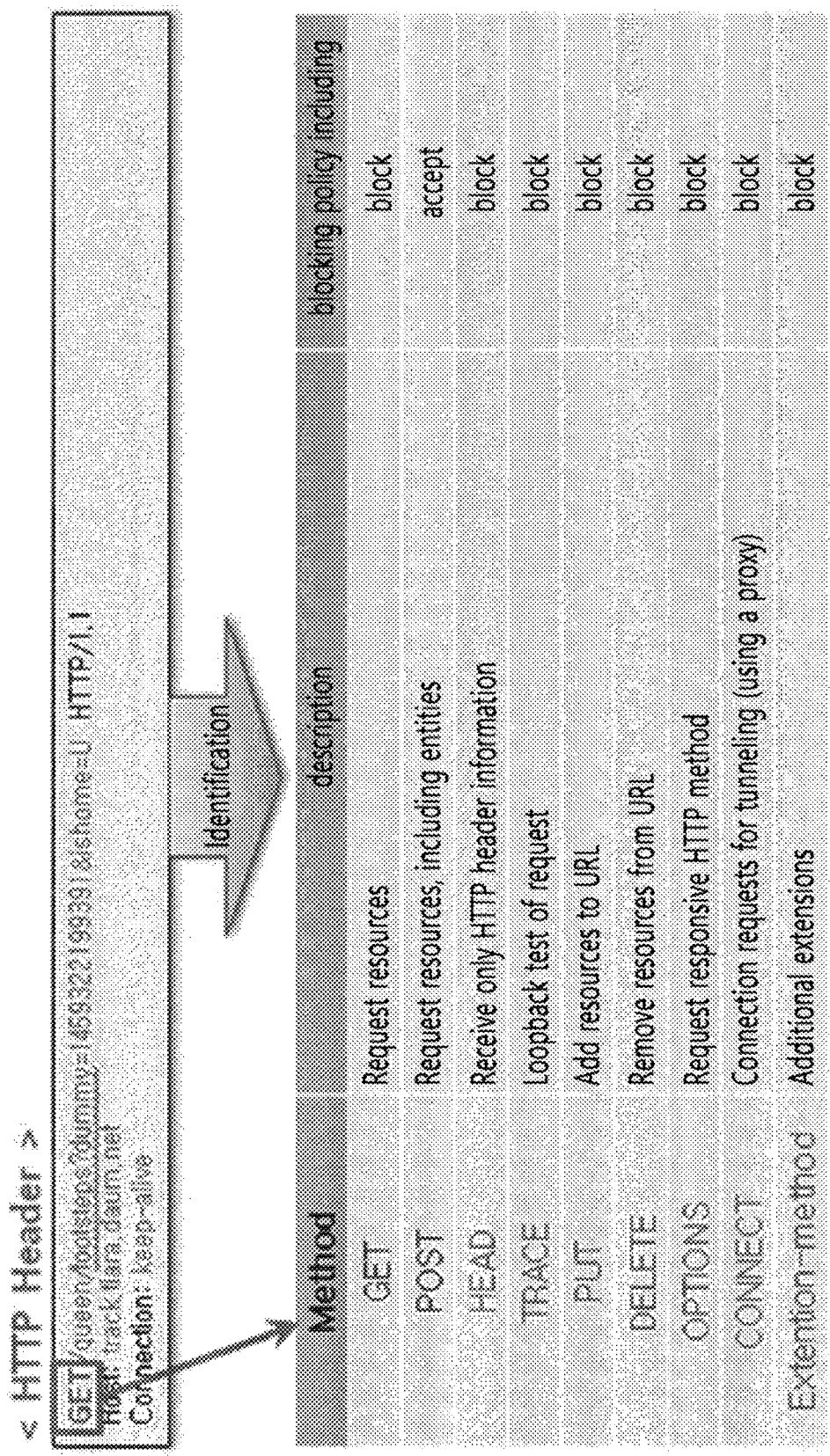
Figure 17:
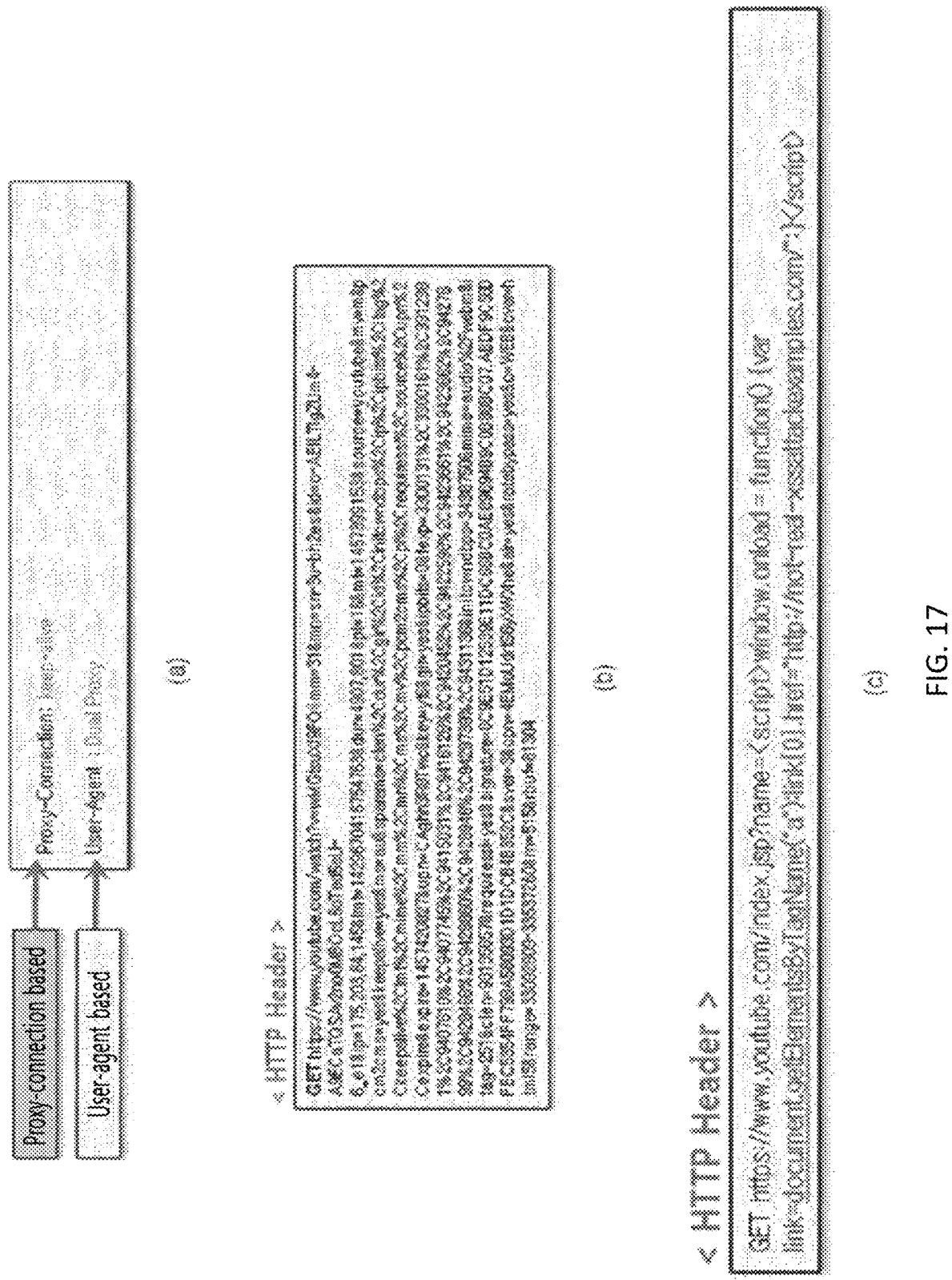

FIGS. 15 through 17 illustrate one example of performing detection based on HTTP header information according to one embodiment of the present disclosure.

Referring to FIG. 15, the User-Agent entry in the HTTP header contains the web client type and version information. The HTTP header information-based detection module 5313 may detect an abnormal transaction via a specific string or blacklist mapping.

Referring to FIG. 16, the HTTP header information-based detection module 5313 performs blocking for methods other than GET and POST, which are generally used among HTTP methods. Methods such as CONNECT and TRACE are used in bypass attack. Thus, when such a method is requested, such an event may be detected as an abnormal web client.

Referring to FIG. 17*a*, when a web hacking attack occurs at the session level, a request may be made via the proxy server to hide its IP. In such a case, the case where the string "Proxy-Connection" exists in the HTTP Header or the string that allows identifying the proxy server exists in the User-Agent value may be detected by the HTTP header information-based detection module 5313.

Referring to FIG. 17*b*, the HTTP header information-based detection module 5313 may detect an abnormal transaction, that is, an abnormal web client, using a call parameter mapping. In one example, the module can detect the abnormal transaction by setting a detection pattern for the requested Query String using the GET and POST methods.

Referring to FIG. 17*c*, the HTTP header information-based detection module 5313 may detect an abnormal web client when a script is included in a call parameter. When the data entered from the user includes a script, the script runs in the web client. Thus, the executed script may obtain cookie values and may hack information using DOM (Document Object Model) Access, Clipboard Access, and Key logging. Accordingly, the HTTP header information-based detection module 5313 inspects the data input by the user and detects abnormal data such as a script.

Further, the HTTP header information-based detection module 5313 may perform PCRE detection on the HTTP header information via regular expression generation for abnormal transaction detection.

Referring again to FIG. 10, the DB access information-based detection module 5315 detects bulk data inquiry using the DB access information collected by the DB access information collection module 507 of the WEB plug-in agent 50. Using the DB access information, the DB access information-based detection module 5315 may detect Perl Compatible Regular Expressions (PCRE) patterns for SQL queries and bind variables and detect abnormal transactions based on the detection thereof.

Figure 18:
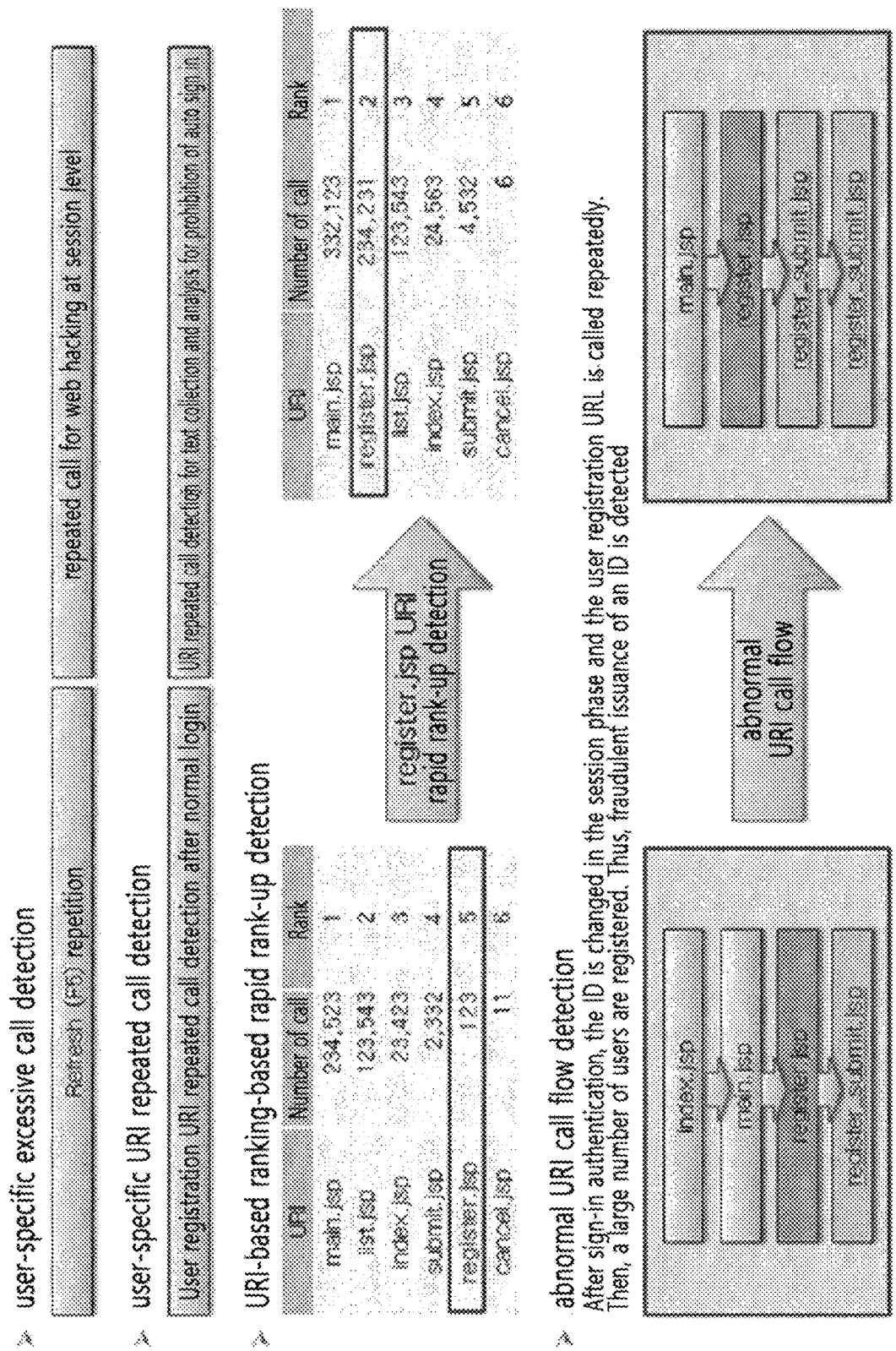
FIG. 18 shows one example of a statistical data-based detection method using unique session ID-based user identification according to one embodiment of the present disclosure.

The statistical data-based detection module 5317 performs user identification based on the same unique session ID as shown in FIG. 18. Based on this, the module may perform user-specific excessive call detection, user-specific URI repeated call detection, URI-based ranking-based rapid rank-up detection, and abnormal URI call flow detection.

The analysis module 532 may include a session ID-based statistical analysis module 5321, HTTP header information-based statistical analysis module 5323, and URI performance information-based statistical analysis module 5325.

The session ID-based statistical analysis module 5321 may provide transaction analysis continuity via the unique session ID, accurately calculate the number of visitors per day and hour, analyze the transaction distribution for each unique session ID, and perform statistical analysis. Further, the session ID-based statistical analysis module 5321 may perform statistical analysis of the number of calls per user, URI call flow analysis per user, and continuous transaction distribution analysis per user. That is, when the conventional session ID is used, and the web browser is closed or the PC is shut down, a new session ID is created. As a result, session-based statistical analysis was impossible. However, according to the present disclosure, various statistical analysis can be performed using a fixed unique session ID assigned to each user ID.

The HTTP header information-based statistical analysis module 5323 analyzes statistical analysis per call client, statistical analysis per request method, statistical analysis per region, etc. based on HTTP header information (User-Agent information, HTTP Method, Remote IP, etc.).

The URI performance information-based statistical analysis module 5325 analyzes various statistical indexes per user (per unique session ID, user ID, and user session ID), analyzes various statistical indexes per domain, using URI performance information.

The blocking control module 533 may include a blocking policy management module 5331 and a blocking policy control module 5333.

The blocking policy management module 5331 may perform User-Agent blacklist management, to-be-blocked method management, to-be-blocked session ID management, to-be-blocked user ID management, and to-be-blocked user IP management.

The blocking policy control module 5333 controls blocking policy including permanent blocking control, time-based blocking control, automatic blocking control, and manual blocking control.

The blocking control module 533 transmits the blocking policy to the WAS plug-in agent 50 over the communication module. When an abnormal transaction is detected, the module 533 may send a blocking instruction to the WAS plug-in agent 50 or the WEB plug-in agent 70 via the communication module 534. Further, the module 533 may receive the blocking status from the WAS plug-in agent 50 or the WEB plug-in agent 70.

In the conventional security management system, transaction information is collected during the SSL/TLS encryption interval, so that only limited information may be analyzed.

Therefore, it is impossible to analyze the packet flow, and thus there is a limit in statistical information analysis. However, according to the present disclosure, various types of decrypted information in the memory of the web application server may be collected, thereby allowing various types of statistical analysis to be performed.

The present disclosure may be embodied as computer readable code stored in a computer readable recording medium. The computer-readable recording medium includes all kinds of recording devices capable of storing data that can be read by a computer.

Examples of the computer-readable recording medium include ROM, RAM, CD-ROM, magnetic tape, floppy disk, optical data storage, and the like. Such a recording medium may be implemented in the form of a carrier wave (transmission via the Internet).

Further, the computer readable recording medium may be distributed over a networked computer system. In this case, the computer readable codes in a distributed manner may be stored and executed in the computers. Functional programs, code and code segments for implementing the present disclosure may be easily inferred by programmers in the technical field to which the present disclosure belongs.

In the above description, numerous specific details are set forth in order to provide a thorough understanding of the present disclosure. The present disclosure may be practiced without some or all of these specific details. Examples of various embodiments have been illustrated and described above. It will be understood that the description herein is not intended to limit the claims to the specific embodiments described. On the contrary, it is intended to cover alternatives, modifications, and equivalents as may be included within the spirit and scope of the present disclosure as defined by the appended claims.

What is claimed is:

1. A security system comprising:
a web application server (WAS) that includes a memory in which a WAS plug-in agent is installed or a web server (WEB) that includes a memory in which a WEB plug-in agent is installed, wherein the WAS plug-in agent or WEB plug-in agent is configured to collect transaction information; and
a management server configured to:
receive the transaction information from the WAS plug-in agent or WEB plug-in agent;
determine whether the transaction information is normal or abnormal;
generate detection information based on the determination; and
upon determination that the transaction information is abnormal,
transmit, to the WAS plug-in agent or the WEB plug-in agent, a blocking instruction to block a transaction corresponding to the abnormal transaction information,
wherein the WAS plug-in agent is operated in a plug-in manner in the WAS and the WAS plug-in agent collects transaction information of a user decrypted by the WAS from a memory of the WAS,
wherein the WEB plug-in agent is operated in a plug-in manner on the WEB and the WEB plug-in agent collects transaction information of a user decrypted by the WEB from memory of the WEB,
wherein the WAS plug-in agent includes a unique session ID management module, and the unique session ID management module is configured:
when a user requests a service to the WAS, to determine that a fixed unique session ID is contained in a persistent cookie; and
upon determination that the fixed unique session ID is not contained in the persistent cookie, to generate a unique session ID for the user, to transmit the generated session ID to a web client of the user, to add the generated unique session ID to the persistent cookie, and to identify the user using the unique session ID at a subsequent service request,
wherein the WAS plug-in agent includes an information collection module,
wherein the information collection module includes at least one of an HTTP header information collection module, a web session ID collection module, a user ID information collection module, a DB access information collection module, a WAS information collection module, and a URI (uniform resource identifier) information collection module,
wherein the HTTP header information collection module is configured to analyze a HTTP header contained in the transaction information and to collect HTTP header information, wherein the HTTP header information includes at least one of an HTTP method, a URI, a query string, an HTTP Protocol Version, a host, a connection, an accept, a user-agent, a referer, an accept-encoding, a cookie, other header information, and attribute information,
wherein the web session ID collection module is configured to collect a user session ID and the unique session ID from the transaction information,
wherein the user ID information collection module is configured to collect user ID information included in the transaction information and at a processing of a transaction,
wherein the DB access information collection module is configured to collect DB access information included in the transaction information, wherein the DB access information includes at least one of a number of SQL execution events, SQL bind variables, and a number of selects, a number of inserts, the number of updates, a number of deletes and connection pool usage, and connection pool un-return information, wherein the WAS information collection module is configured to collect at least one of a host name of the WAS, a WAS container name, an instant name, a service port, an OS, and a WAS resource usage, wherein the URI information collection module is configured to collect URI transaction information included in the transaction information, wherein the URI transaction information includes at least one of domain and access port information, access URI, call time, total response time, response time per section, CPU resource usage, processing result, AP error and Query String information, wherein the management server includes a session ID-based detection module, wherein the session ID based detection module is configured to perform at least one of first to third detection modes:

wherein in the first detection mode, an event that transaction information is first requested, and then, the user session ID and unique session ID are generated, and, then, at re-request of the transaction information, the user session ID and the unique session ID are not maintained in the transaction information is detected as DDOS attacks or web crawlers;

wherein in the second detection mode, an event that, at re-request of the service, only the user session ID is maintained and the unique session ID is not maintained is detected as an event that a web client uses a hacking program; and wherein in the third detection mode, the abnormal transaction information is detected via mapping between the unique session ID and the user ID, and wherein the session ID-based detection module is configured to detect, via the mapping between the unique session ID and the user ID:
access from a single terminal by multiple users;
access from multiple terminals by a single user;
attack via a proxy from a single terminal; and/or
attack via IP modulation from a single terminal.

2. The system of claim 1, wherein the WEB plug-in agent includes a unique session ID management module, wherein the unique session ID management module is configured:
when a user requests a service to the web server, to determine whether a unique session ID is included in a permanent cookie;
upon determination that the unique session ID is not included in the cookie, to generates an unique session ID corresponding to the user and to send the unique session ID to a web client of the user;
to add the generated unique session ID to the cookie; and
to identify the user via the unique session ID at a subsequent service request.

3. The system of claim 2, wherein the WEB plug-in agent includes an information collection module, wherein the information collection module includes at least one of an HTTP header information collection module, a web session ID collection module, a user ID information collection module, a web server information collection module, and a URI (uniform resource identifier) information collection module, wherein the HTTP header information collection module is configured to analyze a HTTP header contained in the transaction information and to collect HTTP header information, wherein the HTTP header information includes at least one of an HTTP method, a URI, a query string, an HTTP Protocol Version, a host, a connection, an accept, a user-agent, a referer, an accept-encoding, a cookie, other header information, and attribute information;

wherein the web session ID collection module is configured to collect a user session ID and the unique session ID from the transaction information;

wherein the user ID information collection module is configured to collect user ID information included in the transaction information and at a processing of a transaction;

wherein the web server information collection module is configured to collect at least one of a host name of the web server, a web server container name, an instant name, a service port, an OS, and a web server resource usage;

wherein the URI information collection module is configured to collect URI transaction information included in the transaction information, wherein the URI transaction information includes at least one of domain and access port information, access URI, call time, total response time, response time per section, CPU resource usage, processing result, AP error and Query String information.

4. The system of claim 1, wherein the management server includes a HTTP header information-based detection module, wherein the HTTP header information-based detection module is configured to perform at least one of first to fourth detection modes, wherein in the first detection mode, the HTTP header information-based detection module identifies User-agent information including type and version information of the web client, and detects abnormal transaction based on presence or absence of a specific character string in the User-agent information or via blacklist mapping;

wherein in the second detection mode, an event that the HTTP header information includes an unacceptable method among HTTP methods is detected as an abnormal transaction event by the HTTP header information-based detection module;

wherein in the third detection mode, an event in which a Proxy-connection string is present in the HTTP header or a character string available for identifying a proxy server exists in the User-agent is detected as an abnormal transaction event by the HTTP header information-based detection module;

wherein in the fourth detection mode, the HTTP header information-based detection module detects Perl Compatible Regular Expressions (PCRE) from the HTTP header information.

5. The system of claim 1, wherein the management server includes at least one of a session ID-based statistical analysis module, a HTTP header information-based statistical analysis module, and a URI performance information-based statistical analysis module, wherein the session ID-based statistical analysis module is configured to provide transaction analysis continuity based on each unique session ID, to accurately calculate a number of visitors per day and hour, analyze a transaction distribution based on each unique session ID, and to perform statistical analysis based on each unique session ID, wherein the HTTP header information-based statistical analysis module is configured to analyze statistical analysis per call browser based on HTTP header information, wherein the URI performance information-based statistical analysis module is configured to analyze statistical indexes per domain or statistical information per URI using URI performance information.

6. The system of claim 1, wherein the management server includes a blocking control module, wherein the blocking control module includes a blocking policy management module and a blocking policy control module, wherein the blocking policy management module is configured to perform User-Agent blacklist management, to-be-blocked method management, to-be-blocked session ID management, to-be-blocked user ID management, and to-be-blocked user IP management, wherein the blocking policy control module is configured to control blocking policy including permanent blocking control, time-based blocking control, automatic blocking control, and manual blocking control, wherein the blocking control module is configured to transmit the blocking policy to the WAS plug-in agent over a communication module, wherein when an abnormal transaction is detected, the blocking control module is configured to send the blocking instruction to the WAS plug-in agent.

7. The system of claim 6, wherein the WAS plug-in agent or the WEB plug-in agent includes an abnormal transaction management module configured to receive the blocking instruction from the blocking control module and to block a transaction corresponding to the blocking instruction.

8. The system of claim 1, wherein the management server includes a DB access information-based detection module and a statistical data-based detection module, wherein the DB access information-based detection module is configured to detect bulk data inquiry using the DB access information or to detect Perl Compatible Regular Expressions (PCRE) patterns for SQL queries and bind variables using the DB access information, thereby to detect abnormal transactions based on the detection thereof, wherein the statistical data-based detection module is configured to perform user identification based on a single unique session ID and to perform, based on the user identification, user-specific excessive call detection, user-specific URI repeated call detection, URI-based ranking-based rapid rank-up detection, and abnormal URI call flow detection.

9. The system of claim 3, wherein the management server includes a statistical data-based detection module, wherein the statistical data-based detection module is configured to perform user identification based on a single unique session ID, and to perform, based on the user identification, user-specific excessive call detection, user-specific URI repeated call detection, URI-based ranking-based rapid rank-up detection, and abnormal URI call flow detection.

10. The system of claim 3, wherein the management server includes a HTTP header information-based detection module, wherein the HTTP header information-based detection module is configured to perform at least one of first to fourth detection modes, wherein in the first detection mode, the HTTP header information-based detection module identifies User-agent information including type and version information of the web client, and detects abnormal transaction based on presence or absence of a specific character string in the User-agent information or via blacklist mapping;

wherein in the second detection mode, an event that the HTTP header information includes an unacceptable method among HTTP methods is detected as an abnormal transaction event by the HTTP header information-based detection module;

wherein in the third detection mode, an event in which a Proxy-connection string is present in the HTTP header or a character string available for identifying a proxy server exists in the User-agent is detected as an abnormal transaction event by the HTTP header information-based detection module;

wherein in the fourth detection mode, the HTTP header information-based detection module detects Perl Compatible Regular Expressions (PCRE) from the HTTP header information.

11. The system of claim 3, wherein the management server includes at least one of a session ID-based statistical analysis module, a HTTP header information-based statistical analysis module, and a URI performance information-based statistical analysis module, wherein the session ID-based statistical analysis module is configured to provide transaction analysis continuity based on each unique session ID, to accurately calculate a number of visitors per day and hour, analyze a transaction distribution based on each unique session ID, and to perform statistical analysis based on each unique session ID, wherein the HTTP header information-based statistical analysis module is configured to analyze statistical analysis per call browser based on HTTP header information, wherein the URI performance information-based statistical analysis module is configured to analyze statistical indexes per domain or statistical information per URI using URI performance information.

12. The system of claim 3, wherein the management server includes a blocking control module, wherein the blocking control module includes a blocking policy management module and a blocking policy control module, wherein the blocking policy management module is configured to perform User-Agent blacklist management, to-be-blocked method management, to-be-blocked session ID management, to-be-blocked user ID management, and to-be-blocked user IP management, wherein the blocking policy control module is configured to control blocking policy including permanent blocking control, time-based blocking control, automatic blocking control, and manual blocking control, wherein the blocking control module is configured to transmit the blocking policy to the WAS plug-in agent over a communication module, wherein when an abnormal transaction is detected, the blocking control module is configured to send the blocking instruction to the WAS plug-in agent.

\* \* \* \* \*